(12) United States Patent
Goodwin et al.

(10) Patent No.: US 12,032,994 B1
(45) Date of Patent: Jul. 9, 2024

(54) LINKING OUTPUTS FOR AUTOMATIC EXECUTION OF TASKS

(71) Applicant: Tableau Software, LLC, Seattle, WA (US)

(72) Inventors: Rebecca Rose Goodwin, Seattle, WA (US); Mengxi Chen, Seattle, WA (US); Miranda Rose Rensch, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 443 days.

(21) Appl. No.: 17/504,450

(22) Filed: Oct. 18, 2021

(51) Int. Cl.
*G06F 9/48* (2006.01)
*G06F 11/07* (2006.01)

(52) U.S. Cl.
CPC ............ *G06F 9/4881* (2013.01); *G06F 9/485* (2013.01); *G06F 11/076* (2013.01); *G06F 11/0772* (2013.01)

(58) Field of Classification Search
None
See application file for complete search history.

(56) References Cited

U.S. PATENT DOCUMENTS

| | | | |
|---|---|---|---|
| 4,357,673 A | 11/1982 | Willis et al. | |
| 4,458,323 A | 7/1984 | Willis et al. | |
| 5,339,392 A | 8/1994 | Risberg | |
| 5,421,008 A | 5/1995 | Banning et al. | |
| 5,999,192 A | 12/1999 | Selfridge et al. | |
| 6,278,452 B1 | 8/2001 | Huberman et al. | |
| 6,470,344 B1 | 10/2002 | Kothuri et al. | |
| 6,778,873 B1 | 8/2004 | Wang et al. | |
| 6,784,902 B1 | 8/2004 | Melder et al. | |
| 6,993,553 B2 | 1/2006 | Kaneko et al. | |
| 7,362,718 B2 | 4/2008 | Kakivaya et al. | |
| 7,720,779 B1 | 5/2010 | Perry et al. | |
| 7,793,160 B1 | 9/2010 | McClure et al. | |
| 7,991,723 B1 | 8/2011 | Dubrovsky et al. | |
| 8,418,181 B1 | 4/2013 | Sirota et al. | |

(Continued)

OTHER PUBLICATIONS

Anonymous, "Cursor (databases) Wikipidia, the free enciclopedia," Dec. 2, 2012, XP055222764, Retrieved from the internet: URL:https://en.wikipedia,org/w/index.ph?title-Cursor (databases)&oldid=526008371, 7 pgs.

(Continued)

*Primary Examiner* — Van H Nguyen
(74) *Attorney, Agent, or Firm* — Morgan, Lewis & Bockius LLP

(57) ABSTRACT

A computer receives a first user input linking a first output of a first task to a second task. The first task is scheduled for execution at a specific time. The computer receives a second user input selecting a third task from a list of additional tasks that are downstream from the second task. In response to the second user input, the computer links the third task to a second output of the second task. At the specific time, the computer automatically executes the first task and updates the first output of the first task. After updating the first output of the first task, the computer automatically executes the second task that is linked to the first output of the first task, including updating the second output of the second task. After updating the second output of the second task, the computer automatically executes the third task.

20 Claims, 23 Drawing Sheets

(56) References Cited

U.S. PATENT DOCUMENTS

| | | |
|---|---|---|
| 8,479,136 B2 | 7/2013 | Hopkins et al. |
| 8,626,475 B1 | 1/2014 | Fontes et al. |
| 8,700,682 B2 | 4/2014 | Tedder et al. |
| 8,806,377 B2 | 8/2014 | Chen et al. |
| 8,812,752 B1 | 8/2014 | Shih et al. |
| 8,819,592 B2 | 8/2014 | Jackson, Jr. |
| 8,843,959 B2 | 9/2014 | McMaster et al. |
| 8,863,029 B2 | 10/2014 | Chen et al. |
| 8,976,672 B2 | 3/2015 | Thubert et al. |
| 9,323,503 B1 | 4/2016 | Fontes et al. |
| 9,335,911 B1 | 5/2016 | Elliot et al. |
| 9,465,523 B2 | 10/2016 | Kleser et al. |
| 9,501,585 B1 | 11/2016 | Gautam et al. |
| 9,760,240 B2 * | 9/2017 | Maheshwari ......... G06F 16/248 |
| 10,127,250 B2 | 11/2018 | Dingman et al. |
| 10,127,511 B1 | 11/2018 | Epstein et al. |
| 10,204,173 B2 | 2/2019 | Vaught |
| 10,242,079 B2 | 3/2019 | Kim et al. |
| 10,275,545 B2 | 4/2019 | Yeager et al. |
| 10,339,681 B2 | 7/2019 | Moore |
| 10,380,140 B2 | 8/2019 | Sherman |
| 10,394,691 B1 | 8/2019 | Cole et al. |
| 10,466,978 B1 | 11/2019 | Vidan et al. |
| 10,503,784 B1 | 12/2019 | Dean et al. |
| 10,515,093 B2 | 12/2019 | Sherman |
| 10,528,587 B2 | 1/2020 | Kim et al. |
| 10,733,165 B1 | 8/2020 | Broad et al. |
| 10,885,057 B2 | 1/2021 | Pugh et al. |
| 11,354,165 B1 * | 6/2022 | Li ........................ G06F 9/5061 |
| 11,651,003 B2 * | 5/2023 | Beers ................. G06F 16/2425 715/730 |
| 2002/0055947 A1 | 5/2002 | Schultz et al. |
| 2002/0070953 A1 | 6/2002 | Barg et al. |
| 2002/0080174 A1 | 6/2002 | Kodosky et al. |
| 2002/0157086 A1 | 10/2002 | Lewis et al. |
| 2003/0088546 A1 | 5/2003 | Brown et al. |
| 2003/0167265 A1 | 9/2003 | Corynen |
| 2003/0182582 A1 | 9/2003 | Park et al. |
| 2003/0220928 A1 | 11/2003 | Durand et al. |
| 2004/0034616 A1 | 2/2004 | Witkowski et al. |
| 2004/0078105 A1 | 4/2004 | Moon et al. |
| 2005/0010877 A1 | 1/2005 | Udler |
| 2005/0022129 A1 | 1/2005 | Borenstein et al. |
| 2005/0044525 A1 | 2/2005 | Lazarov |
| 2006/0143534 A1 | 6/2006 | Dall |
| 2006/0168205 A1 | 7/2006 | Barron et al. |
| 2006/0173812 A1 | 8/2006 | Bahl et al. |
| 2006/0247912 A1 | 11/2006 | Suzuki |
| 2007/0016615 A1 | 1/2007 | Mohan et al. |
| 2007/0106515 A1 | 5/2007 | Wong |
| 2007/0112714 A1 | 5/2007 | Fairweather |
| 2007/0150581 A1 | 6/2007 | Banerjee et al. |
| 2007/0198312 A1 | 8/2007 | Bagchi et al. |
| 2007/0214136 A1 | 9/2007 | MacLennan et al. |
| 2007/0288899 A1 | 12/2007 | Fanning et al. |
| 2008/0040704 A1 | 2/2008 | Khodabandehioo et al. |
| 2008/0059563 A1 | 3/2008 | Backmann et al. |
| 2008/0140688 A1 | 6/2008 | Clayton et al. |
| 2008/0150317 A1 | 6/2008 | Kilcrease |
| 2008/0155440 A1 | 6/2008 | Trevor et al. |
| 2008/0159317 A1 | 7/2008 | Iselborn et al. |
| 2008/0183687 A1 | 7/2008 | Law |
| 2008/0195626 A1 | 8/2008 | Ukigawa et al. |
| 2008/0209392 A1 | 8/2008 | Able et al. |
| 2008/0254430 A1 | 10/2008 | Woolf et al. |
| 2008/0262988 A1 | 10/2008 | Williams et al. |
| 2008/0281801 A1 | 11/2008 | Larson et al. |
| 2009/0018996 A1 | 1/2009 | Hunt et al. |
| 2009/0021767 A1 | 1/2009 | Fujimaki |
| 2009/0064053 A1 | 3/2009 | Crawford et al. |
| 2009/0100086 A1 | 4/2009 | Dumant et al. |
| 2009/0248698 A1 | 10/2009 | Rehmann |
| 2009/0276724 A1 | 11/2009 | Rosenthal et al. |
| 2009/0319688 A1 | 12/2009 | Mason et al. |
| 2010/0057618 A1 | 3/2010 | Spicer et al. |
| 2010/0156889 A1 | 6/2010 | Martinez et al. |
| 2010/0299327 A1 | 11/2010 | Kiefer et al. |
| 2011/0283242 A1 | 11/2011 | Chew et al. |
| 2011/0302551 A1 | 12/2011 | Hummel |
| 2011/0320384 A1 | 12/2011 | Chang |
| 2012/0022707 A1 | 1/2012 | Budhraja et al. |
| 2012/0023302 A1 | 1/2012 | Amdt et al. |
| 2012/0102396 A1 | 4/2012 | Arksey et al. |
| 2012/0151453 A1 | 6/2012 | Finking et al. |
| 2012/0209886 A1 | 8/2012 | Henderson |
| 2012/0226742 A1 | 9/2012 | Monchilov et al. |
| 2012/0278015 A1 | 11/2012 | Budhraja et al. |
| 2012/0290950 A1 | 11/2012 | Rapaport et al. |
| 2012/0330869 A1 | 12/2012 | Durham |
| 2013/0042154 A1 | 2/2013 | Agarwa et al. |
| 2013/0080197 A1 | 3/2013 | Kung et al. |
| 2013/0166568 A1 | 6/2013 | Binkert et al. |
| 2013/0212234 A1 | 8/2013 | Bartlett et al. |
| 2013/0283106 A1 | 10/2013 | King et al. |
| 2014/0043325 A1 | 2/2014 | Ruble et al. |
| 2014/0058775 A1 | 2/2014 | Siig et al. |
| 2014/0249999 A1 | 9/2014 | Johnson et al. |
| 2014/0250153 A1 | 9/2014 | Nixon et al. |
| 2014/0365533 A1 | 12/2014 | Debray et al. |
| 2015/0010143 A1 | 1/2015 | Yang |
| 2015/0081701 A1 | 3/2015 | Lerios et al. |
| 2015/0106456 A1 | 4/2015 | van Hoek |
| 2015/0149912 A1 | 5/2015 | Moore |
| 2015/0178877 A1 | 6/2015 | Bogomolov et al. |
| 2015/0200867 A1 | 7/2015 | Dutta et al. |
| 2015/0278258 A1 | 10/2015 | Kienzle et al. |
| 2015/0317344 A1 | 11/2015 | Birdwell et al. |
| 2015/0324437 A1 | 11/2015 | Jiang et al. |
| 2015/0378863 A1 | 12/2015 | Balachandran |
| 2015/0378869 A1 | 12/2015 | Balachandran |
| 2016/0062737 A1 | 3/2016 | Stanfill et al. |
| 2016/0070430 A1 | 3/2016 | Kim et al. |
| 2016/0070451 A1 | 3/2016 | Kim et al. |
| 2016/0086260 A1 | 3/2016 | Vermeulen et al. |
| 2016/0092476 A1 | 3/2016 | Stojanovic et al. |
| 2016/0110369 A1 | 4/2016 | Cervelli et al. |
| 2016/0112460 A1 | 4/2016 | Li et al. |
| 2016/0117371 A1 | 4/2016 | Couris et al. |
| 2016/0179897 A1 | 6/2016 | Zheng et al. |
| 2016/0260063 A1 | 9/2016 | Harris et al. |
| 2016/0306908 A1 | 10/2016 | Fontes et al. |
| 2016/0364434 A1 | 12/2016 | Spitz et al. |
| 2017/0005674 A1 | 1/2017 | Hussain et al. |
| 2017/0032026 A1 | 2/2017 | Parker et al. |
| 2017/0039500 A1 | 2/2017 | Leidner et al. |
| 2017/0069118 A1 | 3/2017 | Stewart |
| 2017/0083585 A1 | 3/2017 | Chen et al. |
| 2017/0116396 A1 | 4/2017 | Gu et al. |
| 2017/0212944 A1 | 7/2017 | Hellman et al. |
| 2017/0277664 A1 | 9/2017 | Mihalcea et al. |
| 2017/0286264 A1 | 10/2017 | Surnarayana |
| 2017/0315516 A1 | 11/2017 | Kozionov et al. |
| 2017/0373932 A1 | 12/2017 | Subramanian et al. |
| 2017/0373992 A1 | 12/2017 | Nair |
| 2018/0024701 A1 | 1/2018 | Sanches et al. |
| 2018/0024731 A1 | 1/2018 | Sanches et al. |
| 2018/0129374 A1 | 5/2018 | Kim et al. |
| 2018/0129719 A1 | 5/2018 | Kim et al. |
| 2018/0129720 A1 | 5/2018 | Kim et al. |
| 2018/0157579 A1 | 6/2018 | Rozenberg et al. |
| 2018/0165297 A1 | 6/2018 | Kuchoor et al. |
| 2018/0314764 A1 | 11/2018 | Orad et al. |
| 2018/0349251 A1 | 12/2018 | Mietke et al. |
| 2018/0367371 A1 | 12/2018 | Nagarajan et al. |
| 2019/0004929 A1 | 1/2019 | Fastabend et al. |
| 2019/0121807 A1 | 4/2019 | Boutros et al. |
| 2019/0138675 A1 | 5/2019 | Fontes et al. |
| 2019/0179927 A1 | 6/2019 | Rao et al. |
| 2019/0258575 A1 | 8/2019 | Dey et al. |

(56) References Cited

U.S. PATENT DOCUMENTS

| | | |
|---|---|---|
| 2019/0294421 A1 | 9/2019 | Pietzsch et al. |
| 2020/0012656 A1 | 1/2020 | Pugh et al. |

OTHER PUBLICATIONS

Anand, Preinterview First Office Action, U.S. Appl. No. 16/167,313, dated Jan. 24, 2020, 6 pgs.

Anand, Notice of Allowance, U.S. Appl. No. 16/167,313, dated Mar. 2, 2020, 9 pgs.

Anand, Notice of Allowance, U.S. Appl. No. 16/908,700, dated Mar. 11, 2021, 10 pgs.

Anand Notice of Allowance, U.S. Appl. No. 17/325,124, dated May 4, 2022, 12 pgs.

Anand Notice of Allowance, U.S. Appl. No. 17/947,027, dated Oct. 10, 2023, 10 pgs.

Bae, J., Understanding Indirect Casual Relationships in Node-Link Graphs, Eurographics Conference on Visualization (Euro Vis) Jun. 2017, vol. 36, No. 3, 12 pgs.

Cole, Office-Action, U.S. Appl. No. 15/726,294, dated Nov. 9, 2018, 40 pgs.

Cole, Notice of Allowance, U.S. Appl. No. 15/726,294, dated May 15, 2019, 14 pgs.

Disclosed Anonymously, ip.com Method to enter data while filter applied, Dec. 6, 2011, (YearL 2011), 7 pgs.

Ghani, S., Perception of Animated Node-Link Diagrams Graphs, Eurographics Conference on Visualization, (Euro Vis) Jun. 2012, vol. 31, No. 3, 11 pgs.

Ishio et al., "A Lightweight Visualization of Interprocedural Data-Flow Paths for Source Code Reading," [Online], 2012, pp. 37-46, retrieved from internet on May 7, 2019, <https://ieeexplore.org/stamp.jsp?tp-&arnumber-6240506> (Year: 2012).

Kabbaj et al., "Towards an Active Help on Detecting Data Flow Errors in Business Process Models," [Online}, 2015, pp. 16-25, [retrieved from internet on Jul. 11, 2020]<https://www.researchgate.net/profile/Mohammed_Isaam_Kabbaj/publication/263966796_Toward_an_active_help_on_detecting_data_flow_errors>(Year:2015), 11 pgs.

Kim, Notice of Allowance, U.S. Appl. No. 15/701,381, dated Nov. 9, 2018, 6 pgs.

Kim, Office Action, U.S. Appl. No. 15/345,391, dated Jun. 28, 2019, 10 pgs.

Kim, Office Action, U.S. Appl. No. 15/345,391, dated Feb. 13, 2020, 16 pgs.

Kim, Final Office Action, U.S. Appl. No. 15/345,391, dated Sep. 17, 2020, 16 pgs.

Kim, Office Action, U.S. Appl. No. 15/345,391, dated Jun. 8, 2021, 14 pgs.

Kim, Final Office Action, U.S. Appl. No. 15/345,391, dated Jun. 6, 2022, 20 pgs.

Kim, Notice of Allowance U.S. Appl. No. 15/345,391, dated Aug. 25, 2023, 8 pgs.

Kim, Pre-Interview First Office Action—U.S. Appl. No. 15/701,392, dated Mar. 9, 2020, 5 pgs.

Kim, Final Office Action—U.S. Appl. No. 15/701,392, dated Sep. 21, 2020, 18 pgs.

Kim, Notice of Allowance, U.S. Appl. No. 15/701,392, dated Apr. 20, 2021, 9 pgs.

Kim, Notice of Allowance, U.S. Appl. No. 15/705,174, dated Sep. 24, 2019, 10 pgs.

Kim, Notice of Allowance, U.S. Appl. No. 16/153,615, dated Jul. 14, 2020, 10 pgs.

Kim, Notice of Allowance, U.S. Appl. No. 16/285,084, dated Apr. 6, 2020, 9 pgs.

Kim, Notice of Allowance, U.S. Appl. No. 16/537,444, dated Jul. 22, 2020, 13 pgs.

Kim, Notice of Allowance, U.S. Appl. No. 16/138,705, dated Aug. 7, 2020, 9 pgs.

Kim, Pre-Interview First Office Action, U.S. Appl. No. 16/937,524, dated Jan. 6, 2022, 6 pgs.

Kim, First Action Interview Office Action, U.S. Appl. No. 16/937,524, dated Mar. 10, 2022, 6 pgs.

Kim, Final Office Action, U.S. Appl. No. 16/937,524, dated Aug. 23, 2022, 22 pgs.

Kim, Office Action, U.S. Appl. No. 16/937,524, dated Apr. 10, 2023, 26 pgs.

Moss, Pre-Interview First Office Action, U.S. Appl. No. 16/228,680, dated Jun. 8, 2021, 5 pgs.

Moss, First Action Interview Office Action, U.S. Appl. No. 16/228,680, dated Aug. 26, 2021, 4 pgs.

Moss, Notice of Allowance, U.S. Appl. No. 16/228,680, dated Oct. 1, 2021, 10 pgs.

Moss, Office Action, U.S. Appl. No. 17/670,407, dated Aug. 31, 2023, 24 pgs.

Moss, Notice of Allowance, U.S. Appl. No. 17/670,407, dated Dec. 28, 2023, 12 pgs.

Pugh, Notice of Allowance, U.S. Appl. No. 16/155,818, dated Oct. 1, 2020, 9 pgs.

Pugh, Notice of Allowance, U.S. Appl. No. 17/142,138, dated Aug. 5, 2021, 9 pgs.

Wildenradt, Notice of Allowance, U.S. Appl. No. 16/681,753, dated May 6, 2021, 10 pgs.

Logothetis et al., "Scalable Lineage Capture for Debugging DISC Analytics," [Online], 2013, pp. 1-15, retrieved from internet on May 7, 2019, <http://delivery.acm.org/10.1145/250000/252369/a17-logothetis.pdf> (Year:2013).

Lovat et al., "On Quantitative Dynamic Data Flow Tracking," [Online], 2014, pp. 211-222, [retrieved from internet on Jul. 11, 2020, <https://dl,acm/doi/pdf/10.11145/2557547.2557551> (Year: 2014), 12 pgs.

Meda et al., "On Detecting Data Flow Errors in Workflows," [Online] 2010, pp. 4:1-4:31, [retrieved from internet on Jul. 11, 2020], <https://dl.acm.org/doi/pdf/10.1145/1805286.1805290> (Year: 2020), 31 pgs.

Moser et al., "Advanced Verification of Distributed WS-BPEL Business Processes Incorporating CSSA-based Data Flow Analysis," [Online], 2007, pp. 1-8, [retrieved from internet on Jul. 11, 2020], <https://ieeexplore.ieee.org/stamp/stamp.jsp?tp=&arnumber=4278643> (Year: 2007), 8 pgs.

Tableau Software, Inc., International Search Report and Written Opinion, PCT/US2017/060232, dated Jan. 18, 2018, 10 pgs.

Tableau Software, Inc., International Search Report and Written Opinion, PCT/US2019/053935, dated Dec. 18, 2019, 13 pgs.

Tableau Software, Inc., Communication Pursuant Rules 161(1) and 162, EP17801216.7, dated Jun. 17, 2019, 3 pgs.

Tableau Software, Inc., Communication Pursuant to Article 94(3), EP17801216.7, dated Apr. 3, 2020, 6 pgs.

Tibco, "Tibco ActiveMatrix BusinessWorks™ Process Design Software Release 5.13," Aug. 31, 2015, retrieved from the Internet: URL:https://docs.tibco.com/pub/activematrix_businessworks/5.13.0/doc/pdf/tib_bw_process_design_guide.pdf, 107 pgs.

Yip et al., "Improving Application Security with Data Flow Assertions," [Online], 2009, pp. 1-18, retrieved from internet on May 7, 2019, <http://www.sigops.org/conferences/sosp/2009/papers/yip-sosp09.pdf> (Year:2009).

\* cited by examiner

LINKING OUTPUTS FOR AUTOMATIC EXECUTION OF TASKS

CROSS-REFERENCE TO RELATED APPLICATIONS

The present application is related to the following five applications, each of which is incorporated by reference herein in its entirety:

- U.S. patent application Ser. No. 15/701,381, filed Sep. 11, 2017, entitled "Optimizing Execution of Data Transformation Flows," now U.S. Pat. No. 10,242,079;
- U.S. patent application Ser. No. 15/345,391, filed Nov. 7, 2016, entitled "User Interface to Prepare and Curate Data for Subsequent Analysis;"
- U.S. patent application Ser. No. 16/155,818, filed Oct. 9, 2018, entitled "Correlated Incremental Loading of Multiple Data Sets for an Interactive Data Prep Application," now U.S. Pat. No. 10,885,057;
- U.S. patent application Ser. No. 16/167,313, filed Oct. 22, 2018, entitled "Data Preparation User Interface with Conglomerate Heterogeneous Process Flow Elements," now U.S. Pat. No. 10,691,304; and
- U.S. patent application Ser. No. 16/228,680, filed Dec. 20, 2018, entitled "Data Preparation User Interface with Conditional Remapping of Data Values."

TECHNICAL FIELD

The disclosed implementations relate generally to data visualization and more specifically to systems, methods, and user interfaces to prepare and curate data for processing by a data visualization application.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including dashboards that have multiple data visualizations. However, some functionality may be difficult to use or hard to find within a complex user interface. In addition, when a dashboard has multiple related data visualizations, it is not apparent how changes to one visualization would affect the other visualizations.

SUMMARY

Some implementations provide a new way of linking two or more outputs to be updated according to a predefined schedule. For example, a user can schedule flows to run at a specific time or on a recurring basis to create scheduled tasks that rely on pre-configured schedules. In addition, a user is provided with options for selecting which outputs in the flow to automatically update according to the predefined schedule. The system automatically determines tasks that are downstream and/or upstream of a selected task to allow a user to easily link the outputs of one task to initiate execution of another task. By allowing users to link outputs from different tasks together, a user need not worry that upstream data is out-of-date when the task has been linked to the refresh of the upstream data, rather than set to run at a scheduled time. Further, the system can prevent a next task from running when a linked task fails to update, which improves the accuracy of data and enables the system to notify users that created any linked tasks when a task fails.

Some implementations provide a method for linking tasks together, such that an update to a first output of a first task automatically triggers execution of a second task. The system automatically provides (e.g., recommends) a list of downstream tasks that can be linked to a particular output. In addition, the system is able to take different actions depending on the success or failure of the first output, such that any linked tasks are also flagged (e.g., a notification is sent to the users that linked the tasks), and the subsequent tasks may be paused or stopped in accordance with a failure of the output. To that end, in accordance with some implementations, a method executes at a computing device (e.g., an electronic device) with a display. For example, the computing device can be a smart phone, a tablet, a notebook computer, or a desktop computer. The method includes receiving a first user input linking a first output of a first task to a second task. The first task is scheduled for execution at a specific time. The method includes, in response to the first user input, providing a list of additional tasks that are downstream from the second task. The method includes receiving a second user input selecting a third task from the list of additional tasks that are downstream from the second task. The method further includes, in response to the second user input, linking the third task to a second output of the second task. The method includes, at the specific time, automatically executing the first task and updating the first output of the first task and after updating the first output of the first task, automatically executing the second task that is linked to the first output of the first task, including updating the second output of the second task. The method further includes, after updating the second output of the second task, automatically executing the third task.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer readable storage medium stores one or more programs configured for execution by a computing device having one or more processors, memory, and a display. The one or more programs include instructions for performing any of the methods described herein.

Thus methods, systems, and graphical user interfaces are disclosed that enable users to easily interact with multiple related data visualizations and data prep flows.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
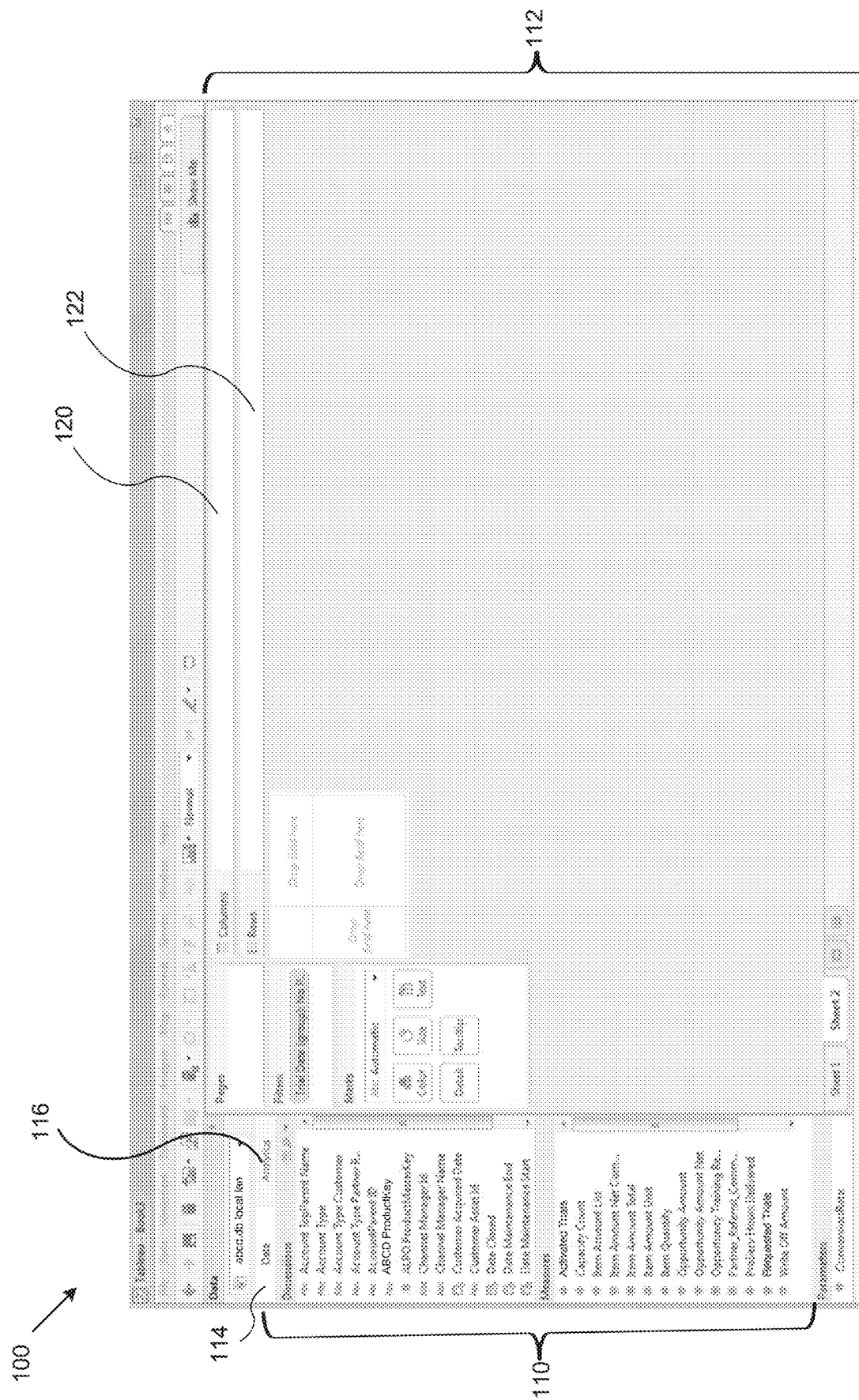
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic. Because no data elements have been selected yet, the space initially has no visual graphic. In some implementations, the data visualization region 112 has multiple layers that are referred to as sheets.

Figure 2:
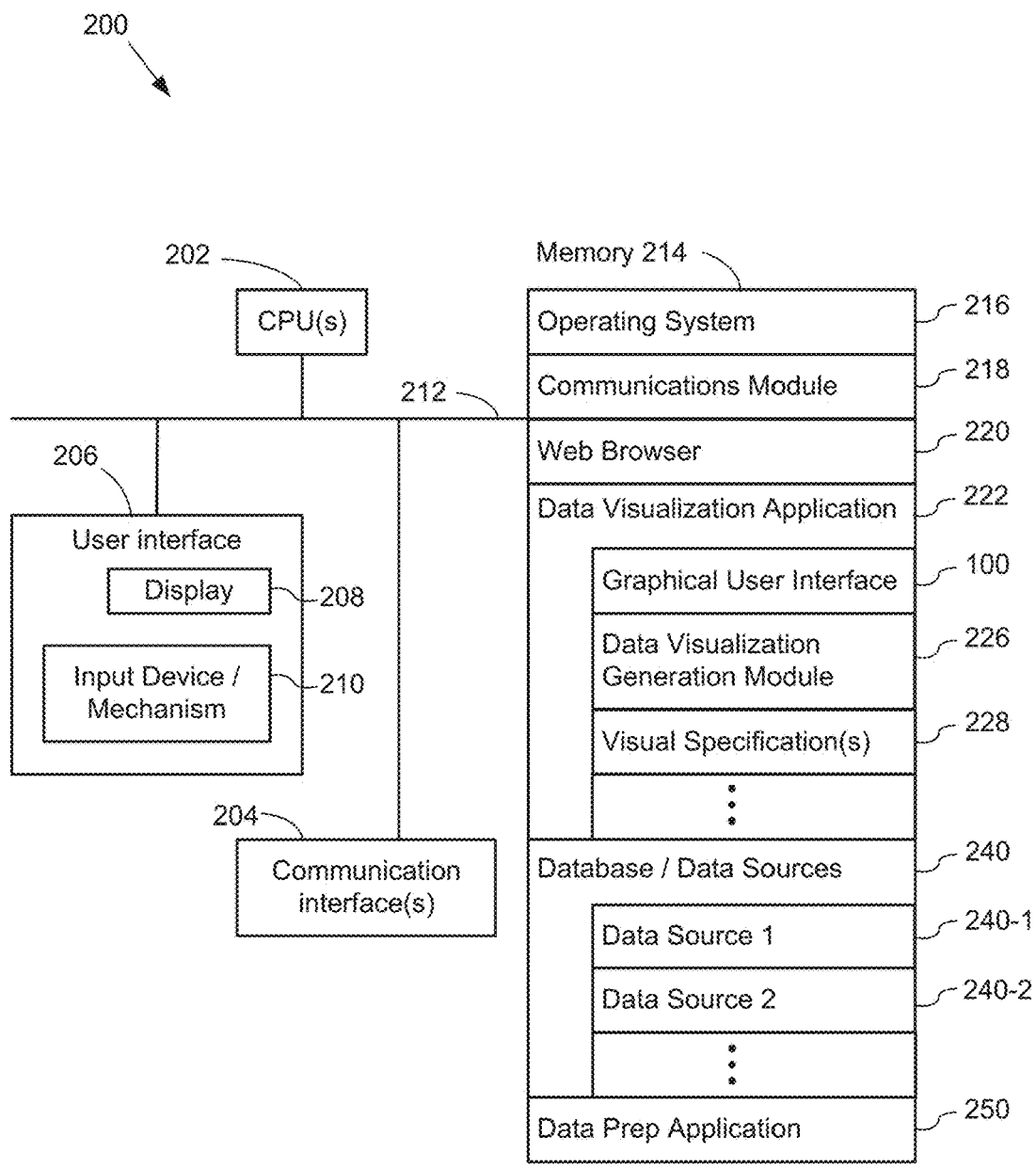
FIG. 2 is a block diagram of a computing device according to some implementations.

FIG. 2 is a block diagram illustrating a computing device 200 that can display the graphical user interface 100 in accordance with some implementations. The computing device can also be used by a data preparation ("data prep") application 250. Various examples of the computing device 200 include a desktop computer, a laptop computer, a tablet computer, and other computing devices that have a display and a processor capable of running a data visualization application 222. The computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222, which provides a graphical user interface 100 for a user to construct visual graphics. For example, a user selects one or more data sources 240 (which may be stored on the computing device 200 or stored remotely), selects data fields from the data sources, and uses the selected fields to define a visual graphic. In some implementations, the information the user provides is stored as a visual specification 228. The data visualization application 222 includes a data visualization generation module 226, which takes the user input (e.g., the visual specification 228), and generates a corresponding visual graphic (also referred to as a "data visualization" or a "data viz"). The data visualization application 222 then displays the generated visual graphic in the user interface 100. In some implementations, the data visualization application 222 executes as a standalone application (e.g., a desktop application). In some implementations, the data visualization application 222 executes within the web browser 220 or another application using web pages provided by a web server; and
- zero or more databases or data sources 240 (e.g., a first data source 240-1 and a second data source 240-2), which are used by the data visualization application 222. In some implementations, the data sources are stored as spreadsheet files, CSV files, XML files, or flat files, or stored in a relational database.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3A:
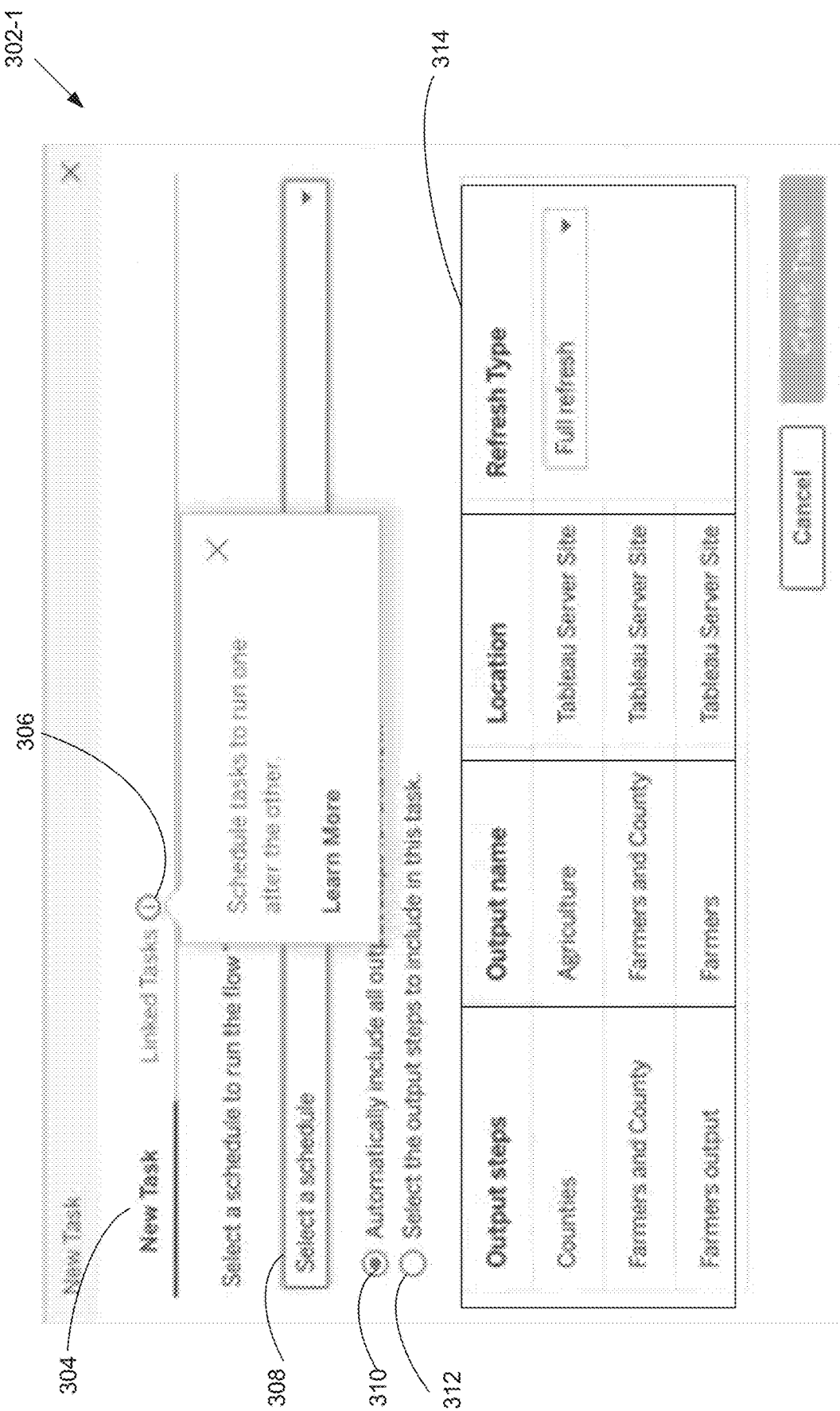
FIGS. 3A-3S illustrate graphical user interfaces for linking tasks to be executed according to task schedules in accordance with some implementations.

FIG. 3A illustrates an example user interface 302-1 for creating a new scheduled task, "Flow B". As used herein, a "flow" (e.g., also referred to as a "task" or a "task flow") may be executed to update one or more outputs ("output steps"). For example, a user connects to (e.g., selects) data that is to be included in a flow, and once the data is in the flow, the user can clean and shape the data by adding new steps to the flow or inserting steps in between existing steps. In some implementations, to organize the flow, the user can change the default step colors, add descriptions to provide context for the steps or cleaning actions, or reorganize the flow layout to make complex flows easier to follow. In some implementations, flows may be scheduled to run at a specific time and/or on a recurring basis. For example, a user can create scheduled tasks that rely (e.g., execute) on pre-configured schedules. In some implementations, schedules are created by a system administrator.

In some implementations, the example user interface 302-1 illustrated in FIG. 3A is a pop-up window (e.g., an overlaid window) displayed over at least a portion of the user interface 100 illustrated in FIG. 1. For example, the user can create a new task (using the "new task" tab 304), including selecting a schedule (using the dropdown 308) on which to run the task (e.g., every day at a particular time). For example, the dropdown 308 provides a plurality of options to schedule automatic execution of the task at a particular frequency (e.g., on a particular schedule).

In some implementations, the user can specify whether all outputs for the task are to be included (e.g., by selecting the first option 310 "automatically include all outputs of this task") or whether a subset, less than all, of the output steps should be included in the new task by selecting the second option 312 "select the output steps to include in this task." If the second option 312 is selected, the user can specify which output steps of the new task are to be updated at the scheduled time. For example, a single task may include a plurality of output steps, as illustrated in the table 314, which shows the "output steps," "output name," "location," (e.g., identification of a server) and "refresh type". In some implementations, a scheduled task can include execution (e.g., refresh) of one or more of the output steps of a task. For example a full refresh will refresh all data and create or append data to a table, whereas an incremental refresh will refresh only the new rows and create or append data to a table. The incremental refresh option is only available when the flow is configured in Tableau Prep Builder to use this refresh type.

Figure 3B:
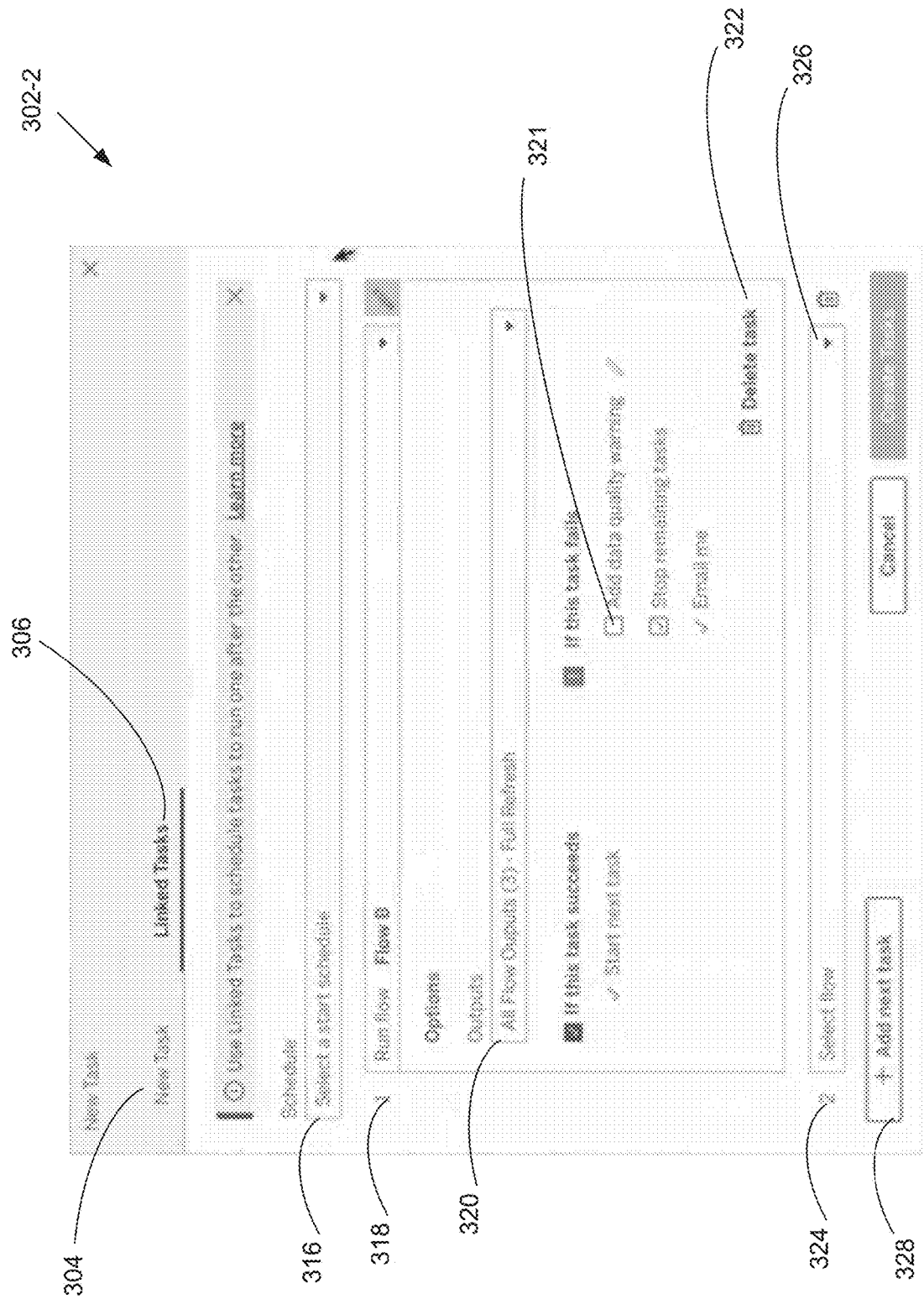

FIG. 3B illustrates a second user interface 302-2, which is the example user interface shown in FIG. 3A, but with the "linked tasks" tab 306 selected. This enables the user to add a task to be linked to run after the task (e.g., the new task created in FIG. 3A). For example, when the linked tasks tab 306 is selected, the user can select a start schedule using the schedule dropdown 316. In this example, the first task selected (with a numeric indicator 318 "1" indicating that it is the first task) is Flow B. For Flow B, the user can select, using the outputs dropdown 320, which outputs to include in the execution of Flow B (e.g., all flow outputs (3)—Full Refresh). This matches the selections made when creating Flow B in FIG. 3A. The user interface further includes an indication of what actions will occur based on the success or failure of executing Flow B. For example, if the task "Flow B" succeeds, a next task (e.g., which will be selected below using the next task dropdown 326) will start, and if "Flow B" fails, the next tasks (e.g., remaining tasks) will not be executed and a notification (e.g., an email) will be sent to the user (e.g., the creator of the linked tasks). In some implementations, the user may also select (e.g., by selecting the data quality option 321) to add a data quality warning (e.g., to indicate in later tasks that certain outputs have not been successfully updated and therefore the data may not be up-to-date) if the task fails. The user interface further provides a Delete option 322 to delete the task.

A second numerical indicator 324 ("2") indicates a second flow that is to be executed after the first flow indicated by "1". For example, the flows are numbered according to the order in which they execute in the schedule. The user can select a flow to execute after Flow B has completed (e.g., successfully) using the next task dropdown 326. The user can add additional tasks (e.g., 3, 4, etc.) using the Add button 328 ("Add next task").

Figure 3C:
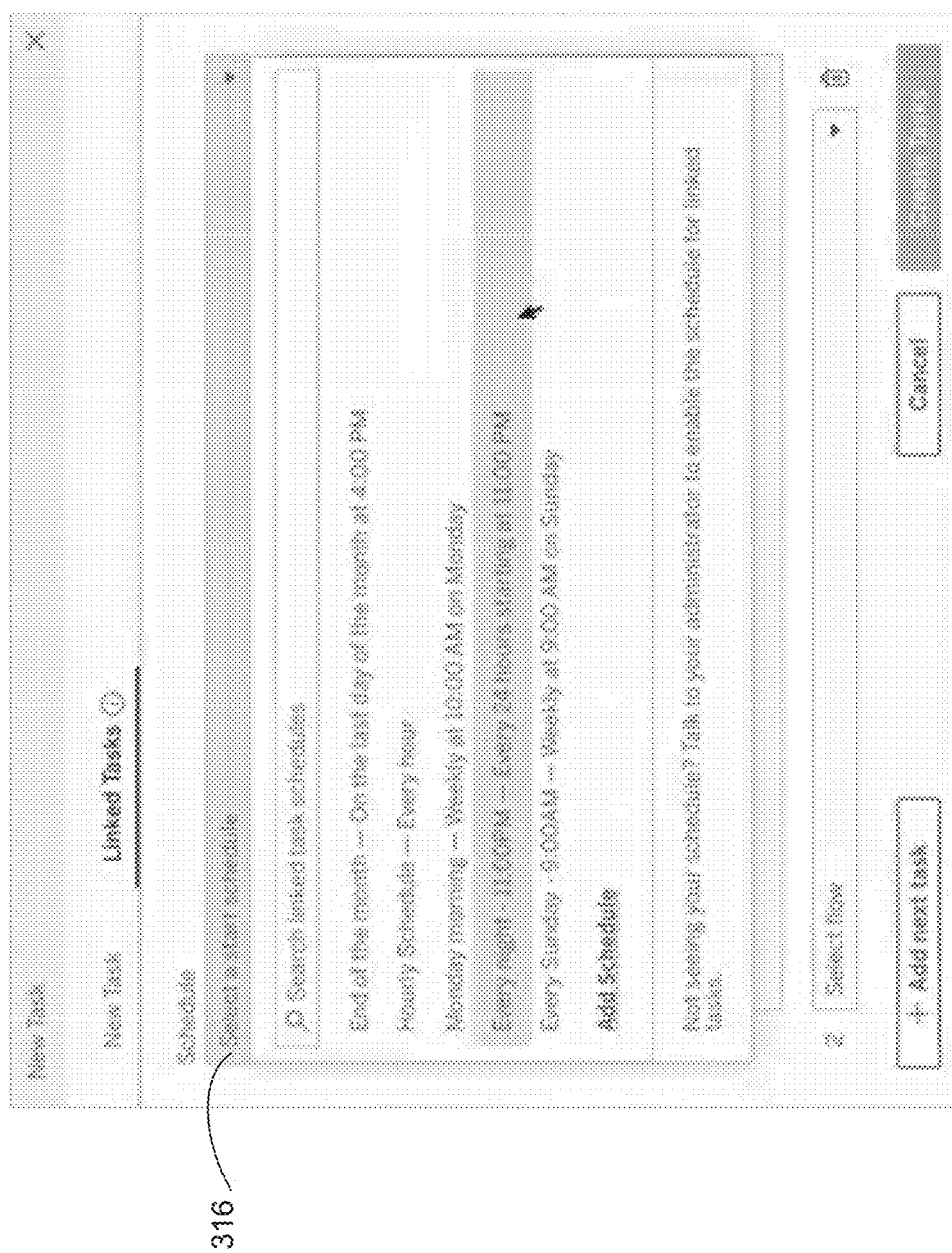

FIG. 3C illustrates the second user interface 302-2 as illustrated in FIG. 3B, with the schedule dropdown 316 expanded to select a start schedule. For example, the expanded schedule dropdown 316 provides a plurality of flow schedules that have been enabled for linked flow use. For example, administrators have the option to allow (e.g., enable) or block (e.g., disable) the ability for users to link particular flows for particular schedules. For example, only flows that have been enabled (e.g., approved) by an administrator are allowed to be used in linked tasks. The available schedules provided in the expanded schedule dropdown 316 include a plurality of periodic scheduling options, such as "End of the month", "hourly", "Monday morning", "every night at 11:00 PM", "Every Sunday—9:00 AM." In some implementations, each of the schedules presented as an option in the schedule dropdown 316 correspond to a scheduled task for which an administrator has enabled linked tasks. In some implementations, only administrators are enabled to "Add a Schedule." An administrator can create a new flow schedule or release additional scheduling options for non-administrator users.

Figure 3D:
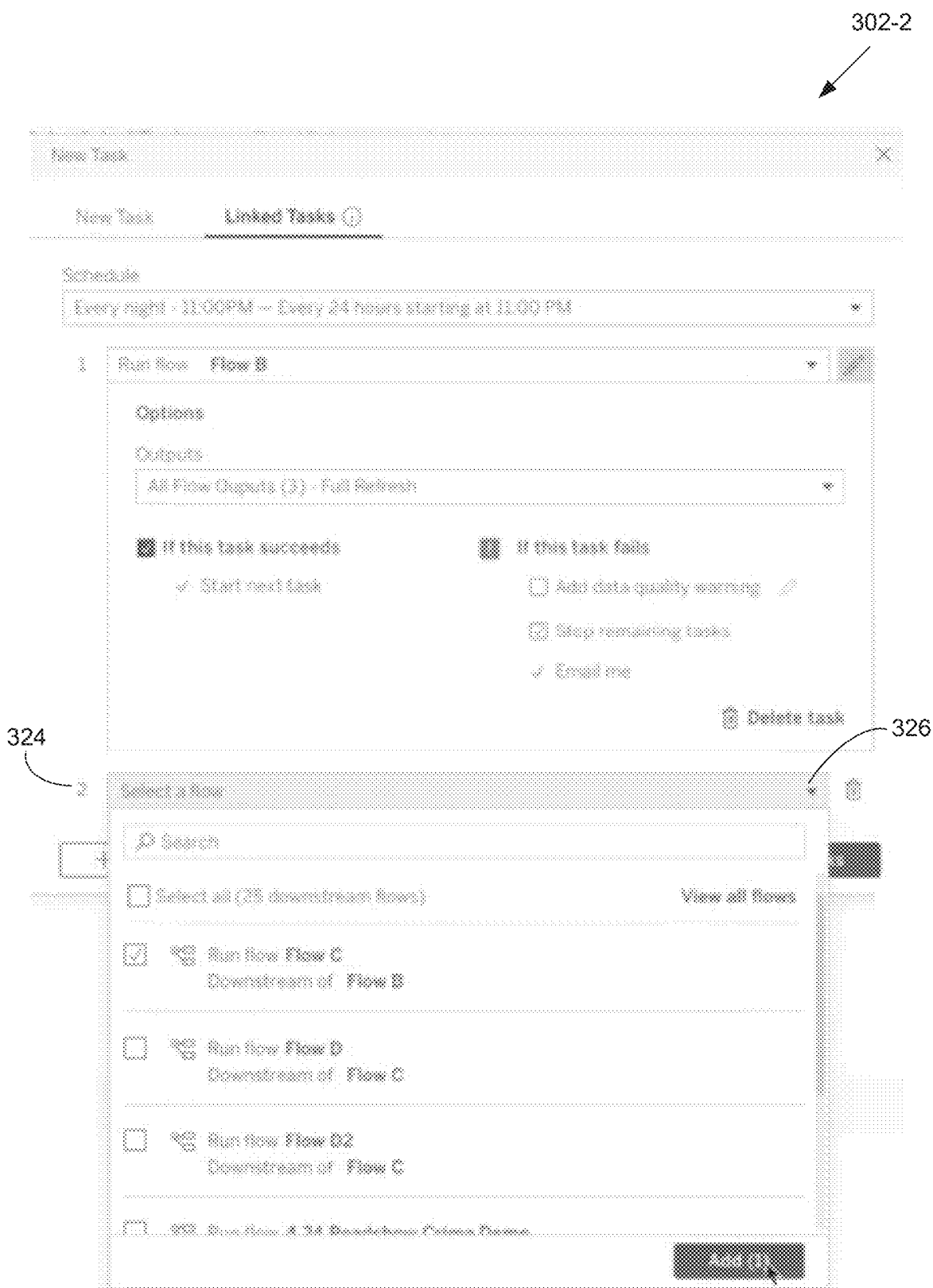

FIG. 3D illustrates expansion of the next task dropdown 326 to provide options for a next flow to be linked from "Flow B." For example, a user can select individual downstream flows by clicking a row or opening the flow in a new tab (e.g., by clicking the link), or can select multiple flows using the check boxes.

Figure 3E:
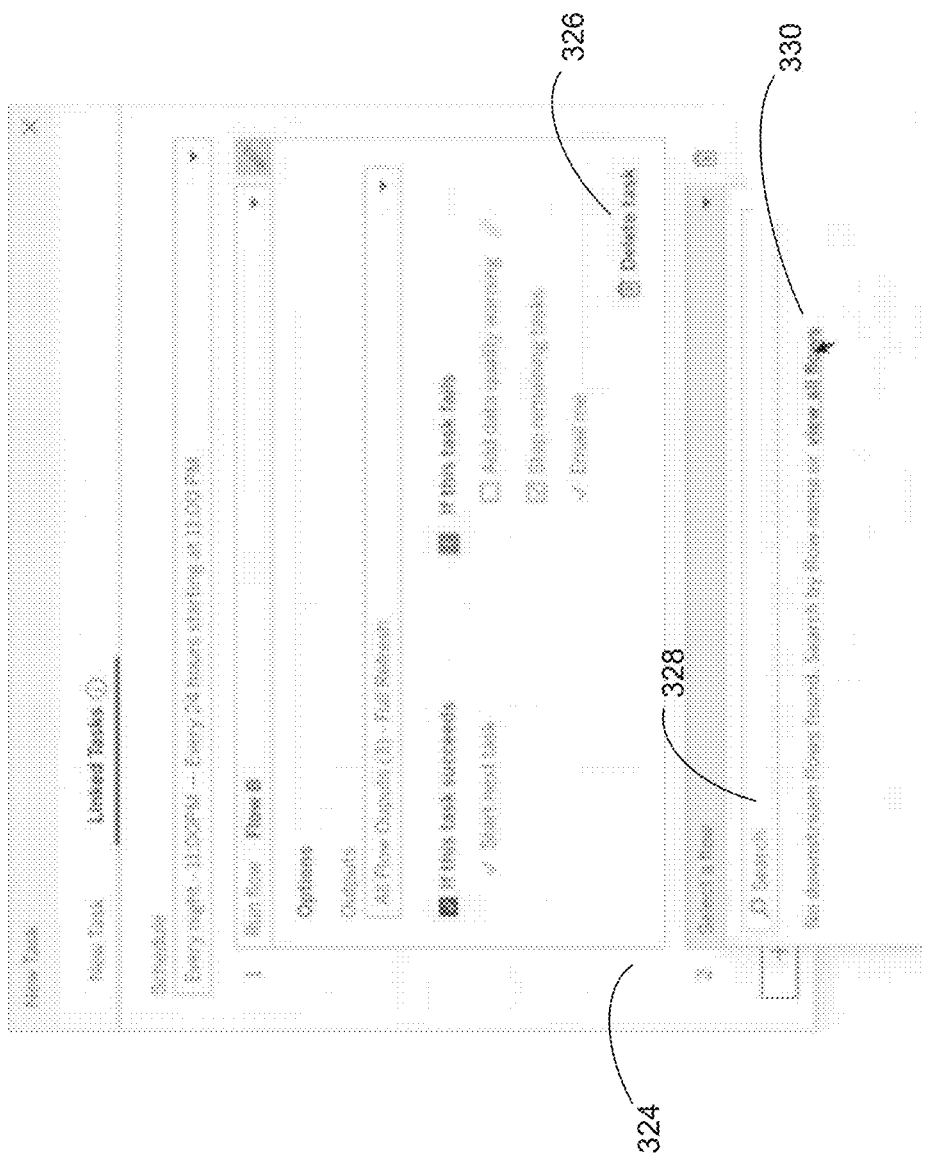

FIG. 3E illustrates alternative options presented in response to expanding the next task dropdown 326. For example, the user interface displays a message indicating that no downstream flows are found (e.g., because all downstream flows are unavailable or there are no downstream flows). In some implementations, the user interface provides a search option (e.g., a search bar 328) such that the user may search for a particular flow to add. In some implementations, the user interface displays a link 330 to view all flows.

Figure 3F:
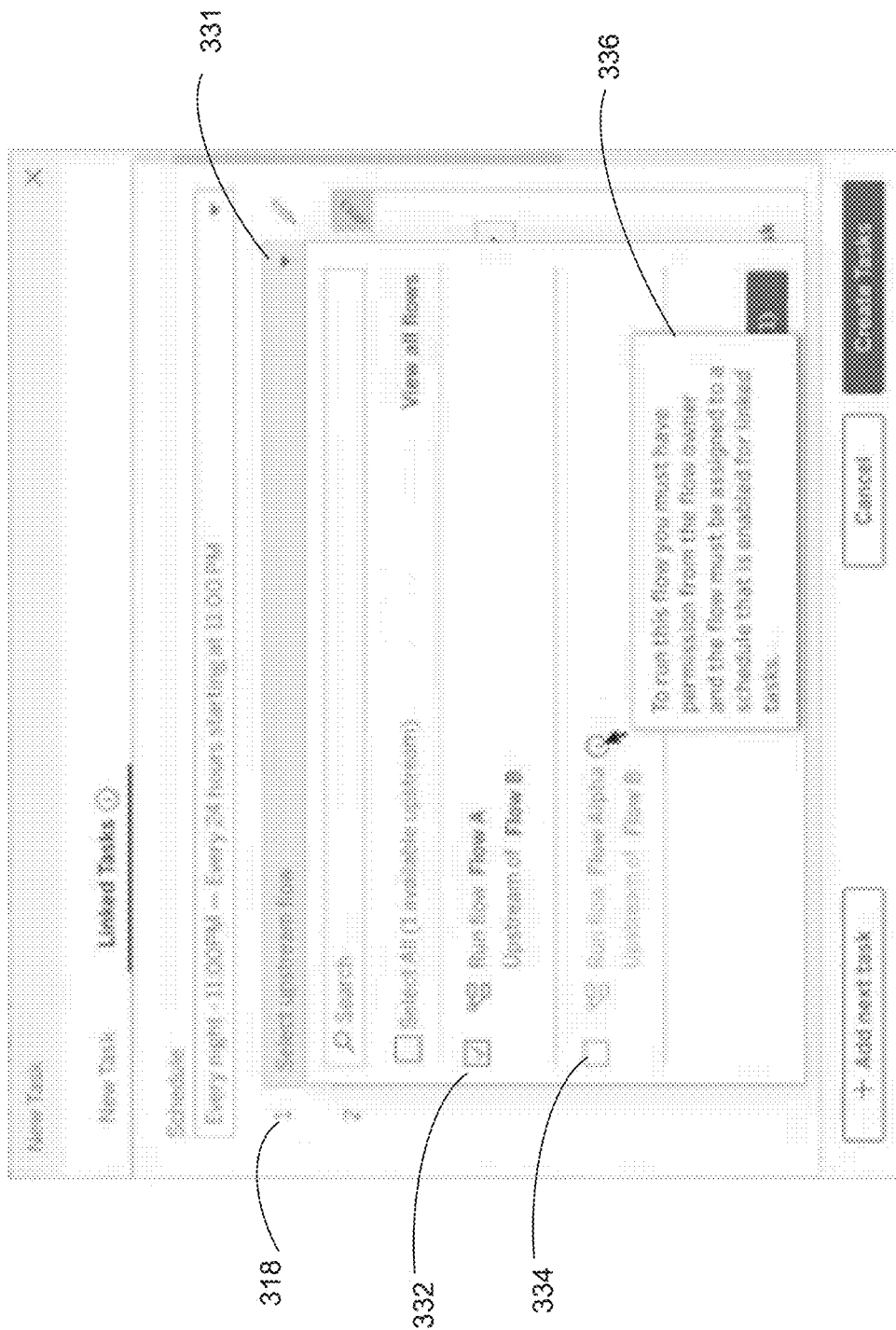

FIG. 3F illustrates the user interface providing an option (e.g., using the flow dropdown 331) to add a flow to be executed before Flow B (e.g., add an upstream flow to Flow B). In this example, the upstream flow is assigned the numeric indicator "1" 318 and Flow B is moved to a position with the numeric indicator "2" because Flow B is downstream from Flow A (and will therefore be executed after Flow A). In this example, a plurality of flows that are upstream from Flow B are displayed with selectable boxes, including a first selectable box 332 (e.g., a check box) for Flow A and a second selectable box 334 (e.g., check box) for Flow Alpha. However, Flow Alpha (e.g., the selectable box and description for Flow Alpha) is displayed as greyed out (or otherwise is presented as not selectable). As illustrated in FIG. 3F, a tooltip 336 (e.g., which is displayed in response to a user input, such as hovering over an information icon) explains why Flow Alpha is not selectable. Tooltip 336 recites "To run this flow you must have permission from the flow owner and the flow must be assigned to a schedule that is enabled for linked tasks." For example, if there is an upstream (e.g., or downstream) flow, but the user does not have permission to schedule the flow (e.g., "Flow Alpha"), the flow appears as disabled (e.g., greyed out) in the list of upstream or downstream flows.

Figure 3G:
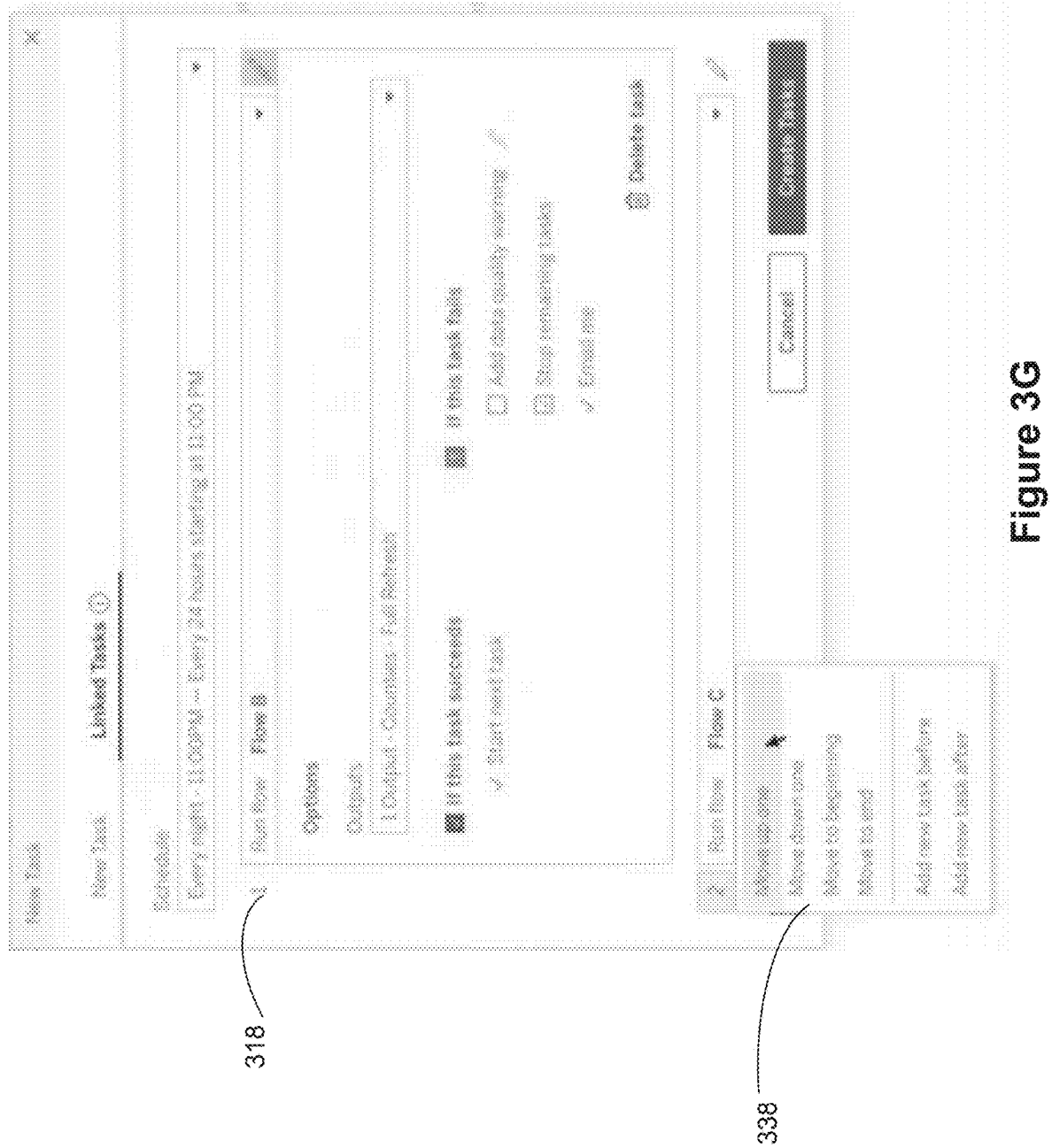

FIG. 3G illustrates the user reordering the scheduled flows (e.g., tasks). For example, Flow B is initially in position 1 (e.g., as indicated by the first numeric indicator 318), to be executed before Flow C (e.g., in position 2). The device receives a user input (e.g., on the numeric indicator "2"), and in response to the user input, the device provides a set of options 338 for the user to reorder the flows: for example, to move Flow C "up one", "down one", "to beginning", or "to end." In addition, the user is presented with options to add new tasks before and/or after Flow C. In some implementations, the user can select the numerical indicator and drag the flow to a different position within the list of flows to re-order the flows. In some implementations, the "move icon" appears in response to detecting a hover input and while the tasks are being re-ordered. In some implementations, this also provides a way for the user to add a task above or below an existing task.

Figure 3H:
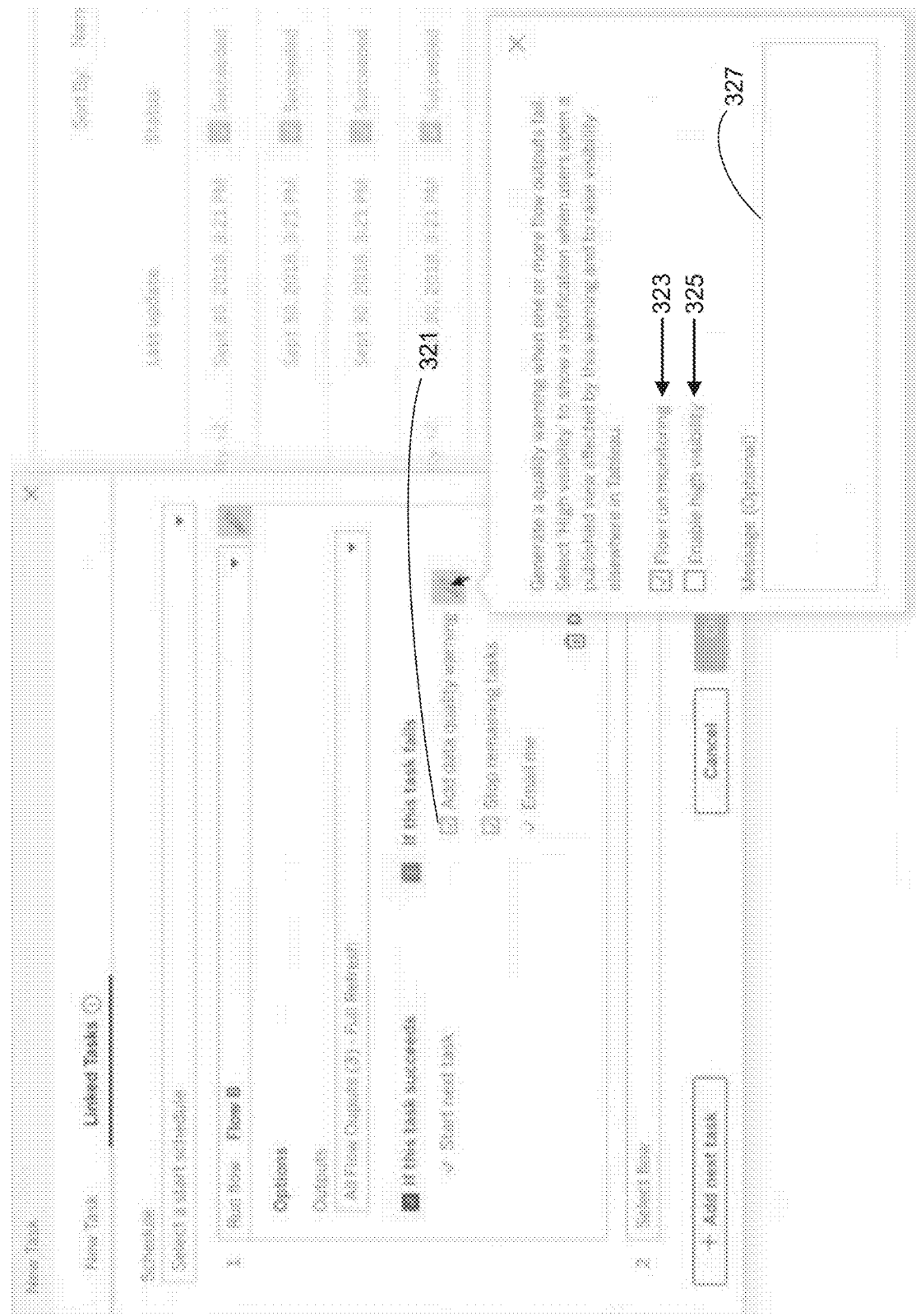

FIG. 3H illustrates a detailed view of configuring the data quality warning option 321 (e.g., as described above with reference to FIG. 3B). In some implementations, in response to the user selecting to add a data quality warning (e.g., by selecting the check box option 321), the user is presented with a plurality of options for the quality warning. For example, the user is provided with a second option 325 to show a "high visibility" warning (e.g., to notify when users open a published view that is affected by the data quality warning). The user is also provided with a message option 327 to add a message to be displayed with the data quality warning (e.g., a more detailed explanation of the warning). In some implementations, the "flow run monitoring" option 323 is automatically selected (e.g., the check box is filled) in accordance with the "add data quality warning" check box being selected. Note that data quality rules are specified elsewhere. The interface here determines what warnings are provided based on flow execution.

Figure 3I:
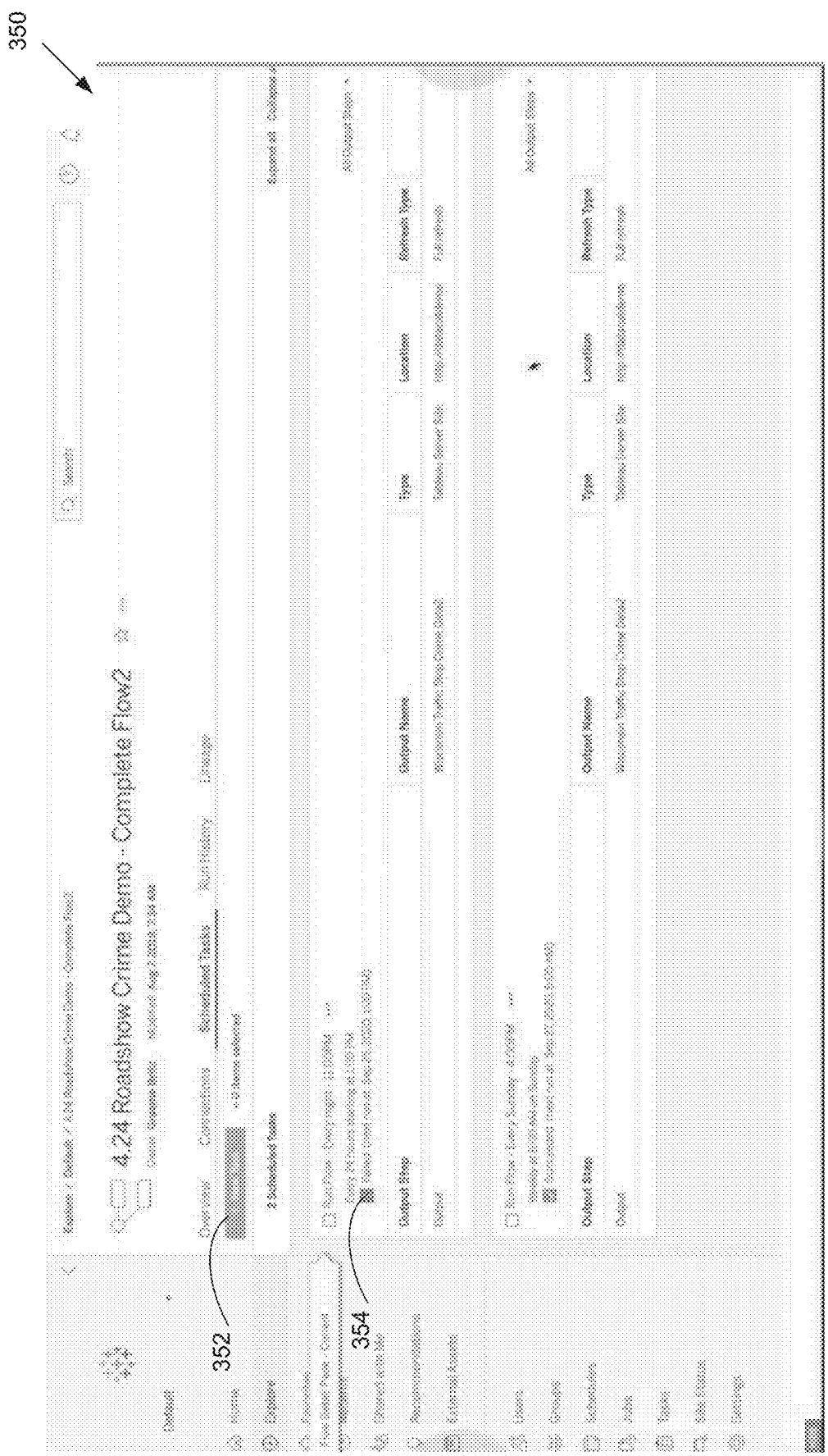

FIG. 3I illustrates a user interface 350 for viewing scheduled tasks. For example, FIG. 3I illustrates that there are 2 scheduled tasks. In addition, the interface 350 includes an option 352 to add a new task. For example, a first scheduled task is scheduled to run every night at 11:00 PM. The user interface 350 further includes a status of the scheduled tasks (e.g., indicating if the task failed or succeeded). For example, the status indicator 354 illustrates that the first scheduled task has "Failed" and displays a next scheduled time that the task will run. The user interface includes details about the first scheduled task, such as details about the output steps for the task (e.g., the output name, the type, the location, and the refresh type). In some implementations, when a scheduled task fails, the computing device sends a notification to users who linked any other tasks to the failed scheduled task. In some implementations, when a task fails a predefined number of times, the tasks linked to run after the failing task are suspended (e.g., not executed), to prevent stale data from propagating through the linked tasks until a user is able to fix the failed scheduled task.

Figure 3J:
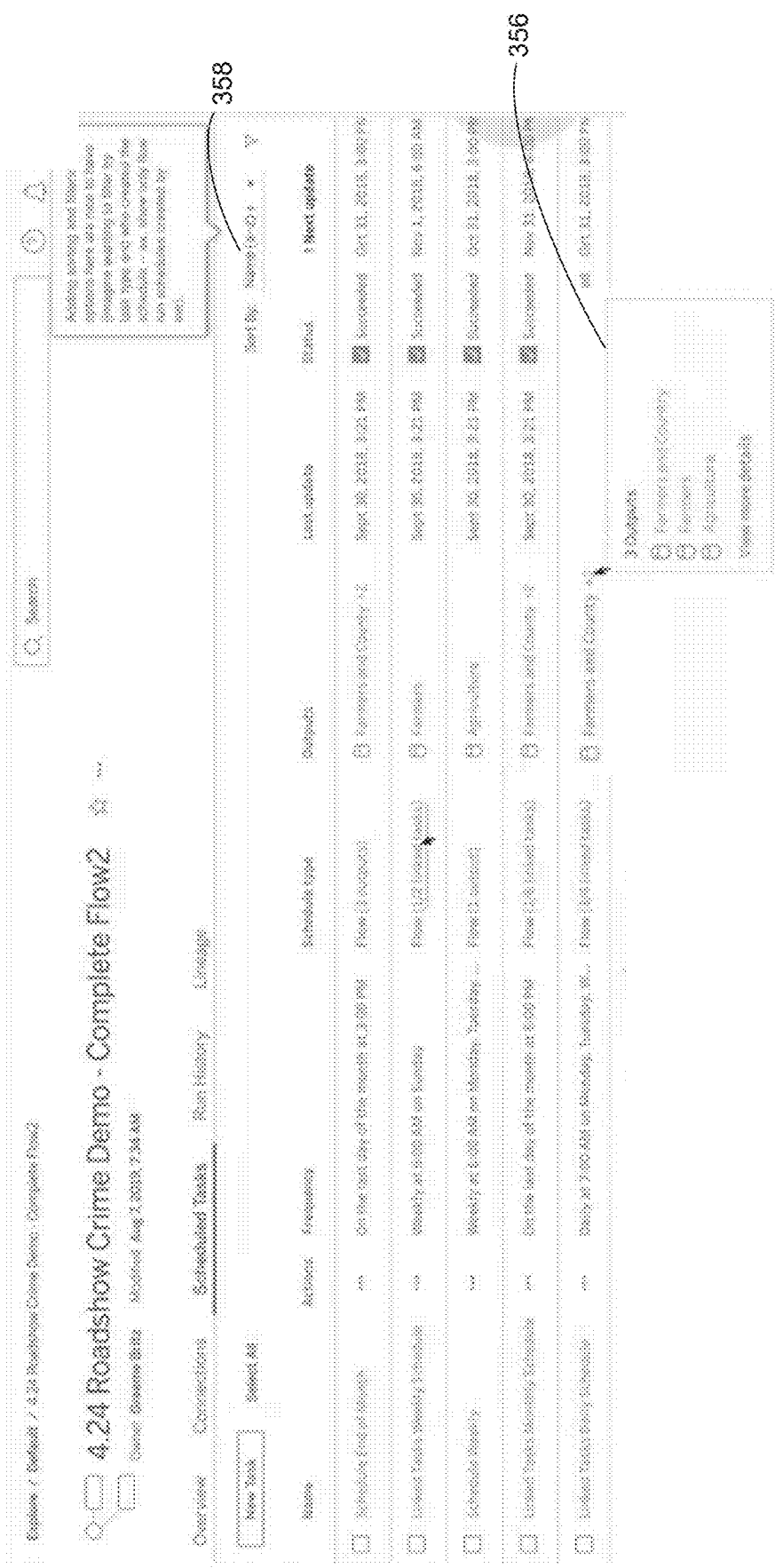

FIG. 3J illustrates an alternative version of the user interface in FIG. 3I. The alternative version displays additional details about the linked tasks. For example, FIG. 3J illustrates a user interface for viewing scheduled tasks in a table view because, after linking a plurality of tasks together (e.g., for scheduled execution of one task after another), additional tasks are displayed in the view (e.g., to allow users to also view downstream linked tasks that use the current flow to run). In some implementations, the table view illustrated in FIG. 3J for displaying scheduled tasks is more scalable and better for sorting and/or filtering than the user interface illustrated in FIG. 3I. Further, the user interface in FIG. 3J includes a column that indicates the scheduled task type and where the flow occurs within the linked task (e.g., 1/2 linked tasks). For example, the clickable elements (e.g., links), when selected, show flow outputs and linked tasks. In some implementations, the same functionality is provided in the user interface illustrated in FIG. 3I (plus additional functionality). FIG. 3J further illustrates that the user can select the "number of outputs" link to see the selected output details and refresh types. For example, the user can select to view more details in order to see a separate output dialog box 356. The output dialog box includes additional information for the selected outputs (e.g., in response to a user hovering over "Farmers and County+2"). Additional details regarding the additional (e.g., +2) outputs are shown in box 356.

In some implementations, the user interface further provides a sort option 358 to sort the list of tasks. For example, a user can sort by name (e.g., A to Z), or otherwise filter the tasks that are shown (e.g., filter by task type and/or the user who created the schedule). For example, a user can choose to view only schedules that were created by the user.

Figure 3K:
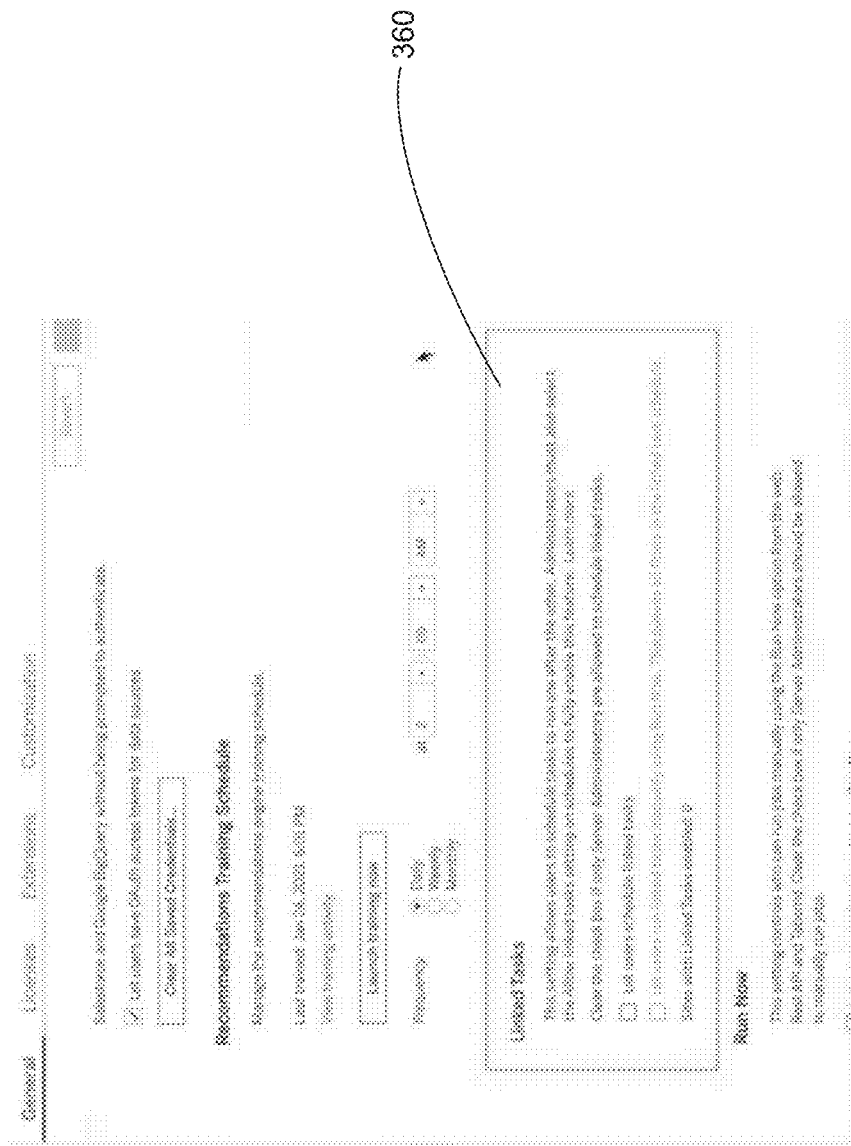

FIG. 3K illustrates a user interface displayed for an administrator (e.g., in a settings user interface for the administrator) to control whether other users are enabled to link tasks together for particular sites. For example, an administrator controls which of the sites will allow other users to use the linked tasks functionality using the options presented in the Linked Tasks dialog box 360.

Figure 3L:
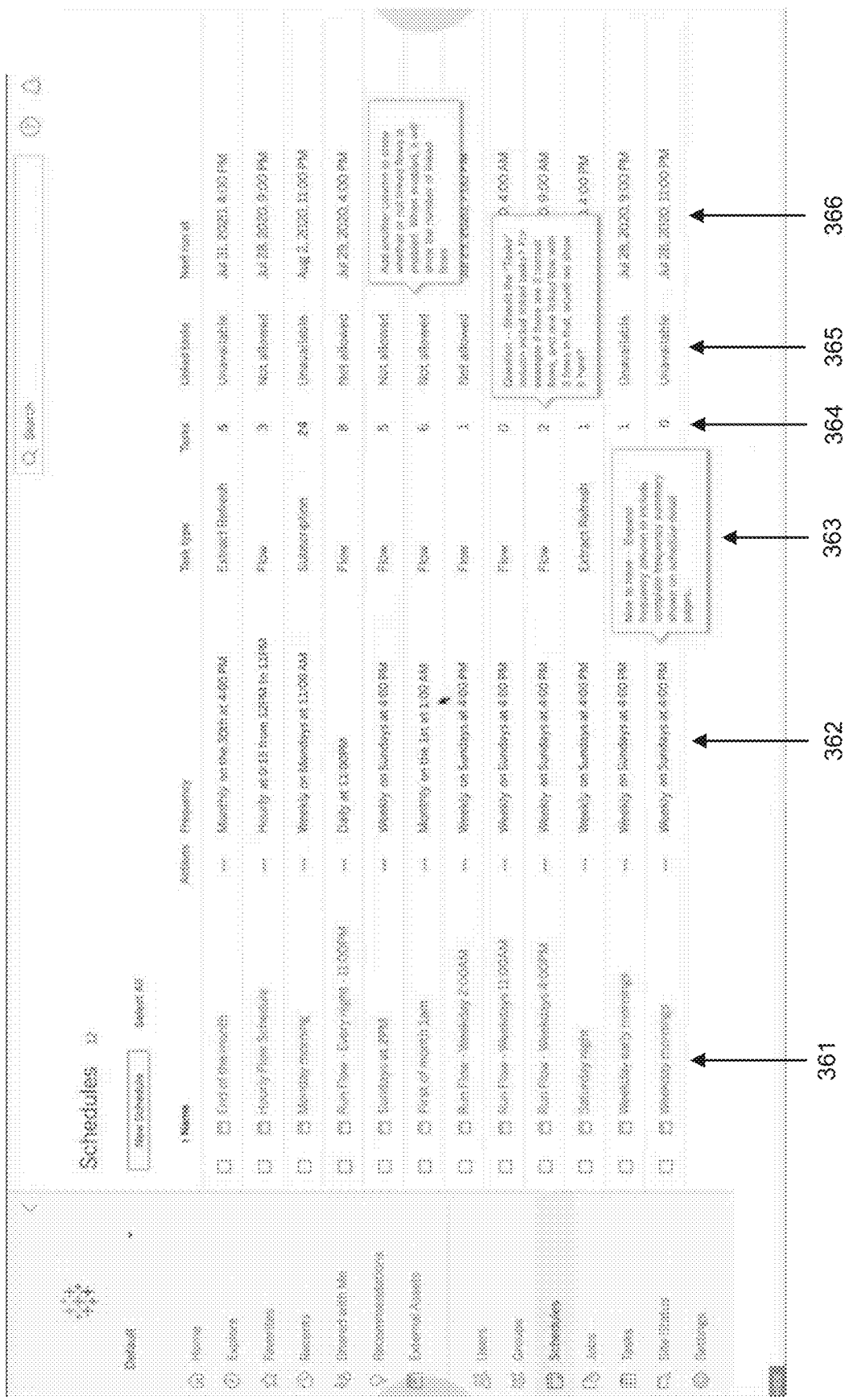

FIG. 3L illustrates a user interface for viewing schedules, which is displayed for an administrator. For example, the list of schedules enables the administrator to view for which schedules linked tasks are allowed or unavailable. For example, the administrator is provided with the Name 361 for each scheduled task, the frequency 362 for each scheduled task, the task type 363 (e.g., an extract refresh, a flow, or a subscription), the number of tasks 364 that are scheduled (e.g., optionally including linked tasks), an indication 365 of whether the linked tasks are enabled for the scheduled task, and an indication 366 of a next time at which the scheduled task is going to run. In some implementations, each task listed in the schedule has zero or more tasks (e.g., flows) that are executed at the scheduled frequency. For example, one or more of the scheduled tasks illustrated in FIG. 3L are not "linked" to other tasks (e.g., each of the scheduled tasks includes zero or more "normal" tasks for the schedule that is not linked to any other tasks). Note that the interface mock-up includes developer annotations that are not displayed in live versions of the interface.

Figure 3M:
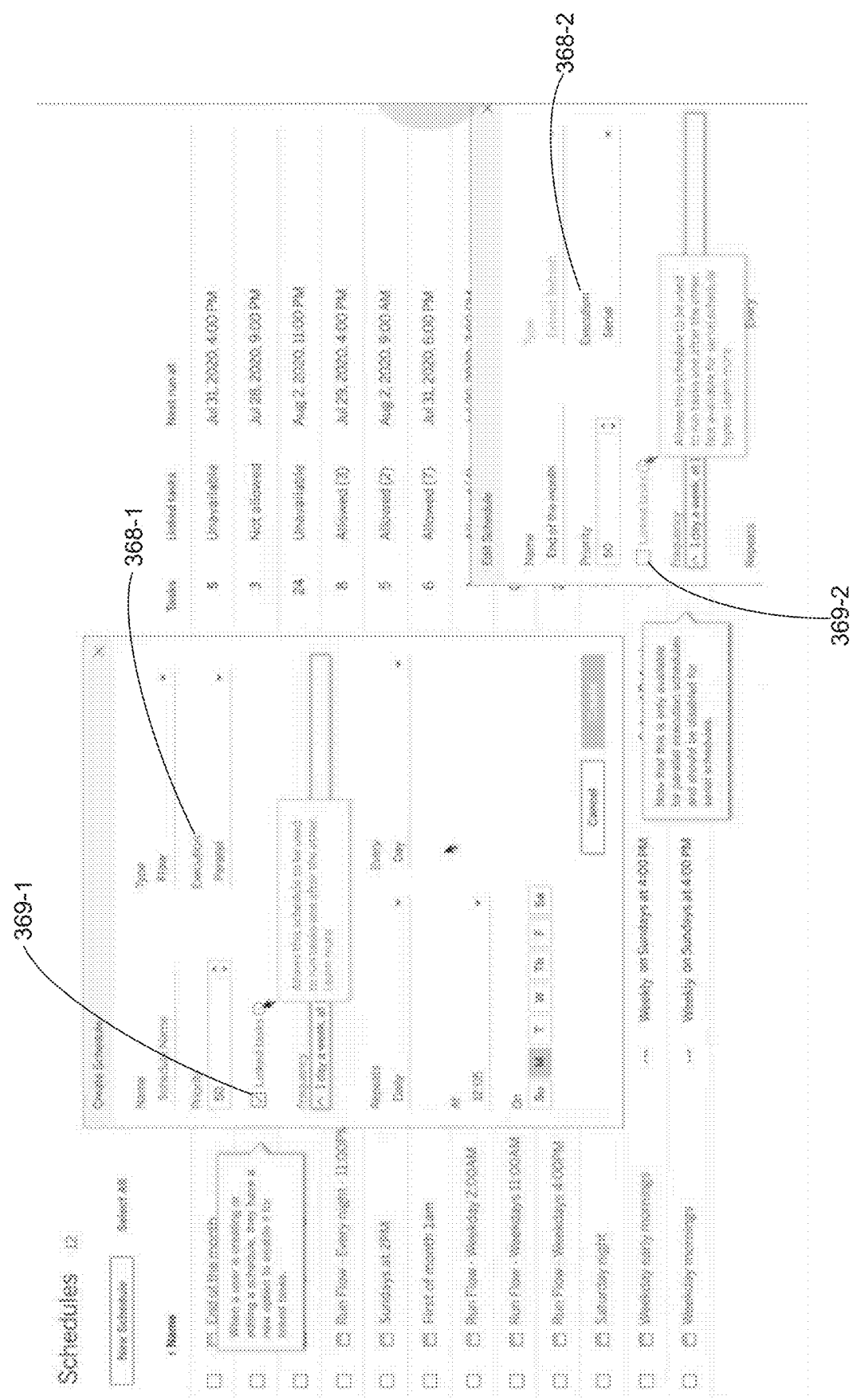

FIG. 3M illustrates a user interface for creating a new schedule. In some implementations, the user interface provides a first selectable option 369-1 (e.g., and the second selectable option 369-2) for enabling linked tasks for the schedule. In some implementations, only tasks that are scheduled for parallel execution (e.g., as indicated by the first execution dropdown 368-1) are enabled to be linked, whereas tasks scheduled for serial execution (e.g., as indicated by the second execution dropdown 368-2) are not enabled to be linked (and the "linked tasks" option 369-2 is greyed out).

Figure 3N:
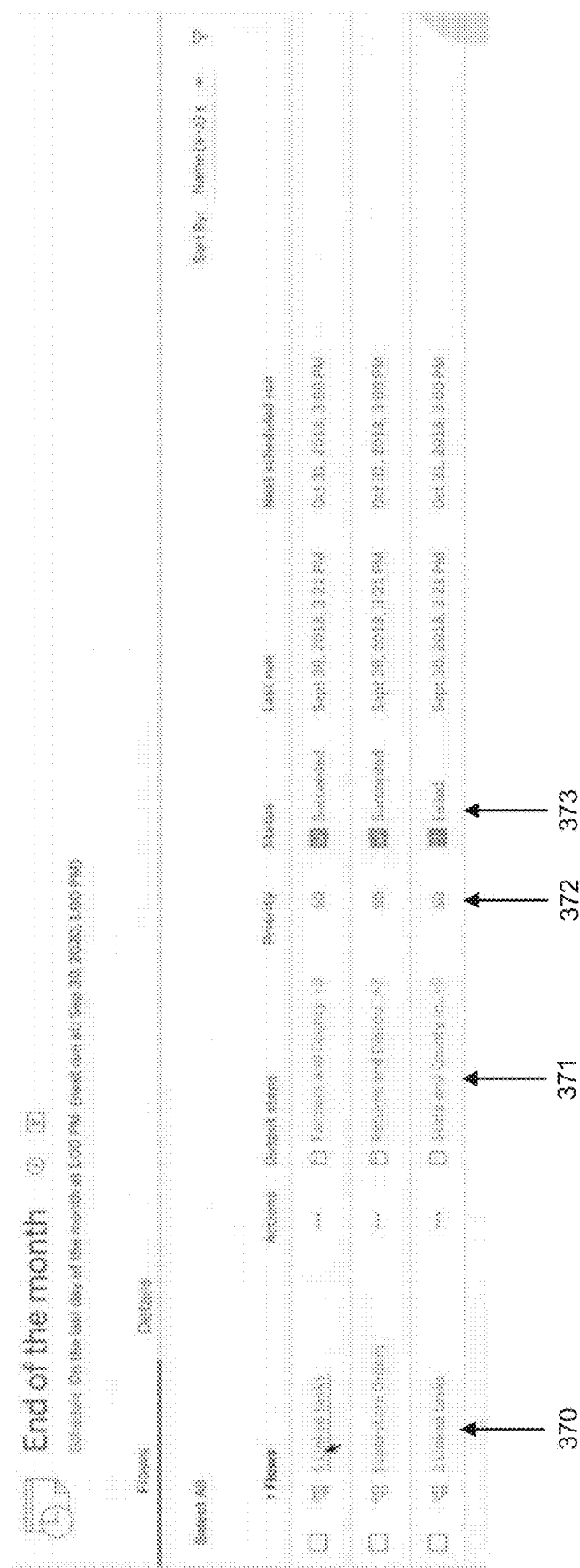

FIG. 3N illustrates an example of viewing tasks that are scheduled for a particular time (e.g., the end of the month). In some implementations, the view includes displaying one or more flows 370 (e.g., tasks), including a number of tasks that are linked to each flow and their output steps 371. In some implementations, the user interface further displays an indication of priority 372 and a status of the tasks 373 (e.g., whether each task succeeded or failed). In some implementations, the computing device displays additional details as to why a task failed (e.g., in response to a user input selecting the "failed" status, such as a hover input over the failed status indicator). For example, the computing device displays a message that states a flow is missing or cannot be found, and instructs the user to edit the task in order to continue running the schedule (e.g., after the failed task is edited and can run).

Figure 3O:
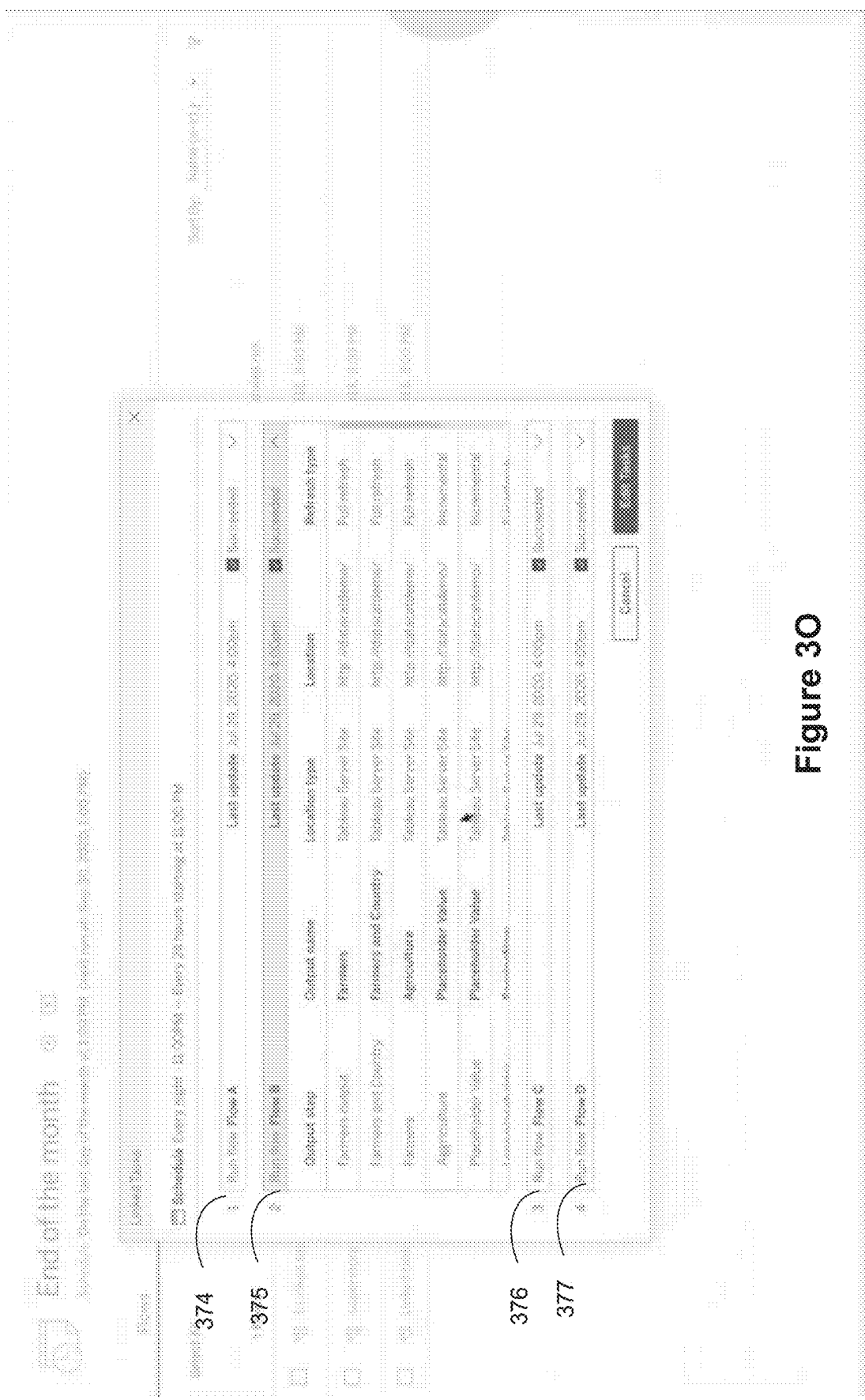

FIG. 3O illustrates a schedule indicating that flow A 374, flow B 375, flow C 376, and flow D 377 will run in the recited order. FIG. 3O further illustrates a plurality of output steps for flow B 375 (e.g., task B). For example, each flow (e.g., task) includes a plurality of output steps and another task may be linked from any of the output steps. A linked task does not have to wait for another task to complete entirely; instead, another task can be linked to one of the outputs of the task, such that once the designated output is updated, the linked task runs.

Figure 3P:
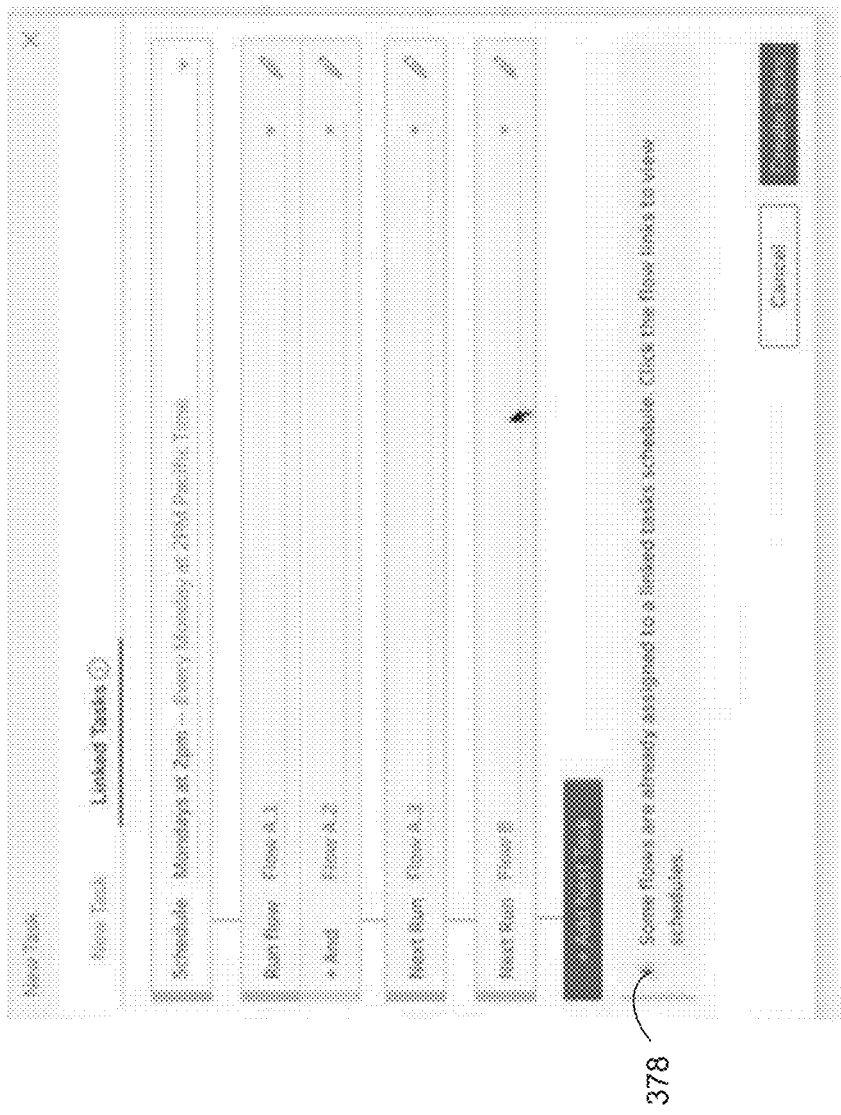

FIG. 3P illustrates a user interface for modifying the scheduled linked flows shown in FIG. 3O. In some implementations, if similar linked tasks or scheduled tasks are detected, the device provides a warning 378 to the user. For example, in this case, if an existing linked task already runs flow A.1 on Mondays at 2 μm and then runs Flow B, the warning 378 indicates this existing link between flow A.1 and Flow B, even though the current linked task links Flow B to run after A.3 (which will already automatically run after flows A.1 and A.2). Accordingly, the computing device determines whether similar linked tasks or scheduled tasks already exist for flows and automatically presents a warning indication to the user if the user is trying to create a different linked relationship between the tasks (or delete a task that is linked to another task).

Figure 3Q:
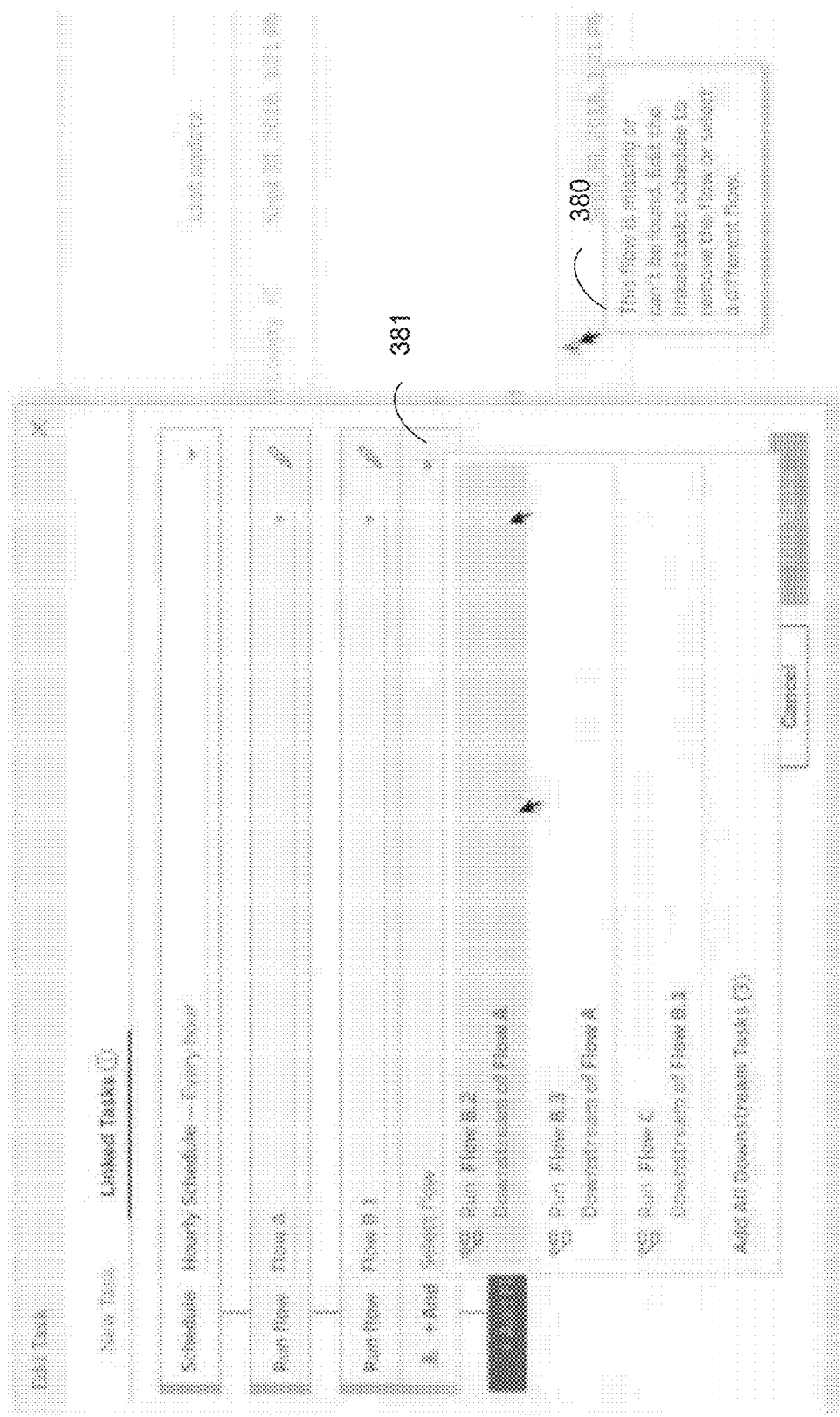

FIG. 3Q illustrates the edit mode in which the computing device warns a user (e.g., with the warning message 380) that a flow (e.g., task) no longer exists (e.g., the flow is missing or cannot be found). For example, the computing device prompts the user to delete or replace the flow. For example, the flow selection dropdown 381 provides a list of available flows that have been identified by the computing device as being downstream of Flow A and/or Flow B.10 for the user to select an available downstream flow.

Figure 3R:
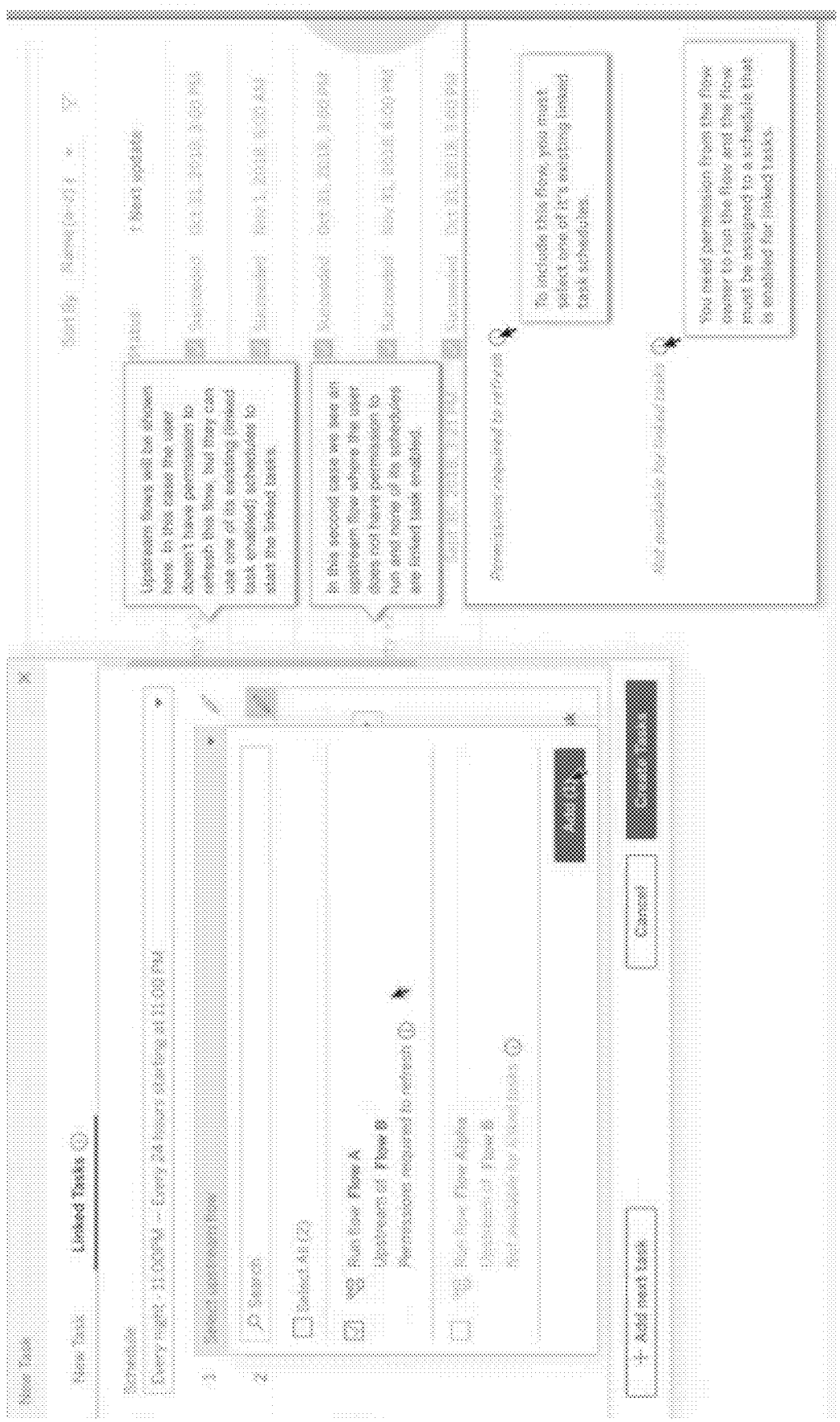

FIG. 3R illustrates an example user interface that displays a plurality of upstream flows (e.g., relative to Flow B) that may be selected to execute before Flow B, thereby linking an output of the upstream flow to Flow B. For example, the computing device automatically identifies zero or more upstream flows of Flow B and displays the identified flows (e.g., Flow A and Flow Alpha). In some implementations, one or more of the identified upstream flows are not selectable (e.g., Flow Alpha is greyed out and not selectable) in accordance with the flow not being available for linked tasks (e.g., an administrator has not enabled linked tasks for Flow Alpha). In some implementations, the computing device automatically (e.g., without user input) determines whether the user has permission to refresh (e.g., update) the upstream (and/or downstream) flows. For example, the user does not have permission to refresh Flow A, but the user can use one of the existing schedules for Flow A to start the linked tasks (e.g., Flow B can run after Flow A is updated). In this way, a user is not able to access or refresh flows for which the user does not have permission, but the user is still enabled to use an output (e.g., one that is refreshed according to an existing schedule) to initiate execution of Flow B. Note that at least one of the upstream schedules for Flow A must have linked tasks enabled (e.g., by an administrator) for the user to link an output of Flow A to Flow B.

Figure 3S:
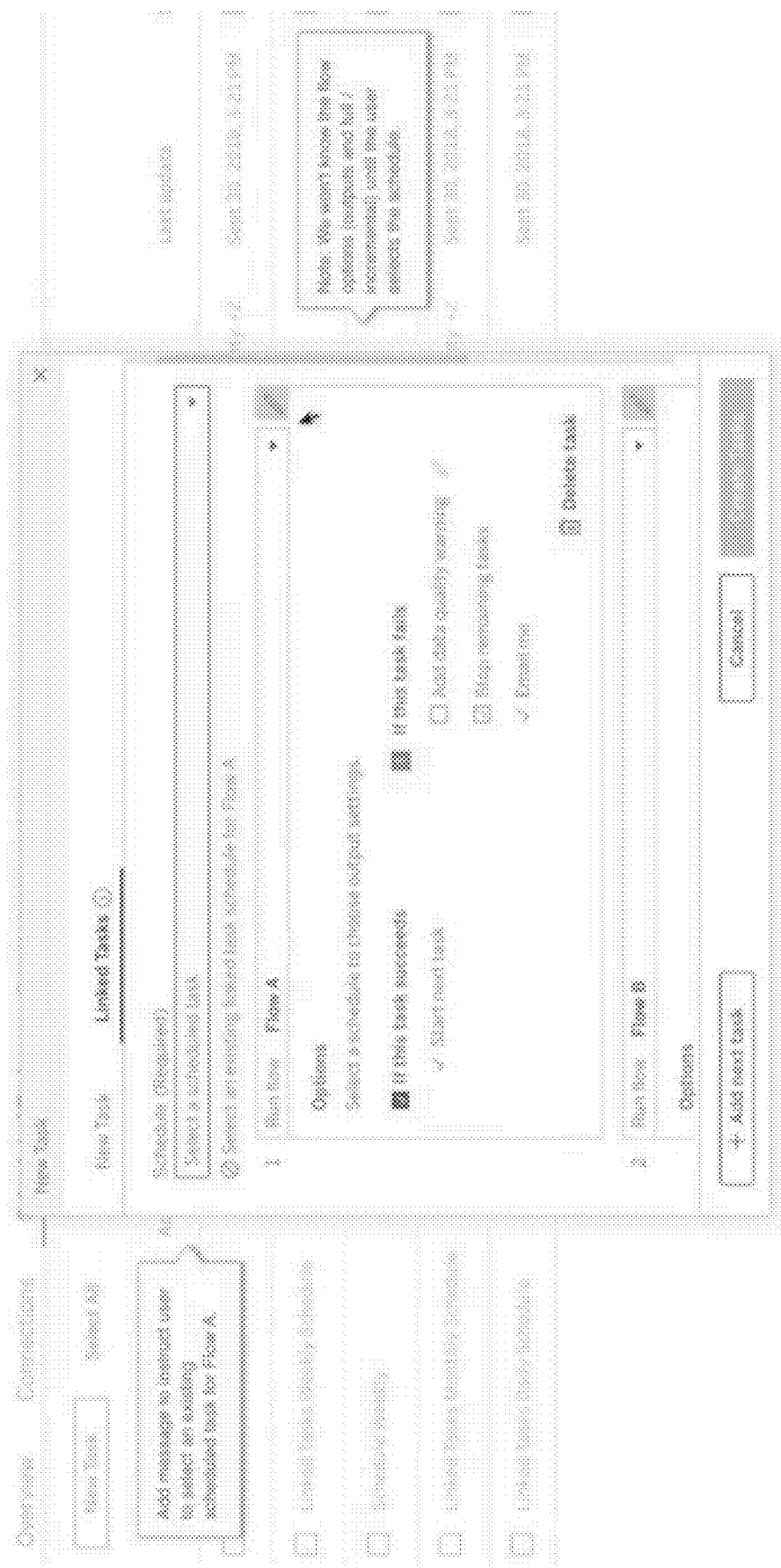

FIG. 3S illustrates an error message that is displayed when the user not yet selecting a scheduled task to initiate flows A and B according to the schedule. For example, different options (e.g., selecting the output and full versus incremental updates) are provided to the user based on the schedule. For example, as illustrated in FIG. 3O, for a selected flow (e.g., Flow B), a plurality of output steps may be selected. Each output step also has a refresh type (e.g., a full refresh or an incremental refresh).

Some of the screens illustrated in FIGS. 3A-3S include developer annotations, which are not displayed in live versions. The developer annotations are rectangular boxes with horizontal triangular protrusions. For example, FIG. 3S includes two developer annotations.

Figure 4A:
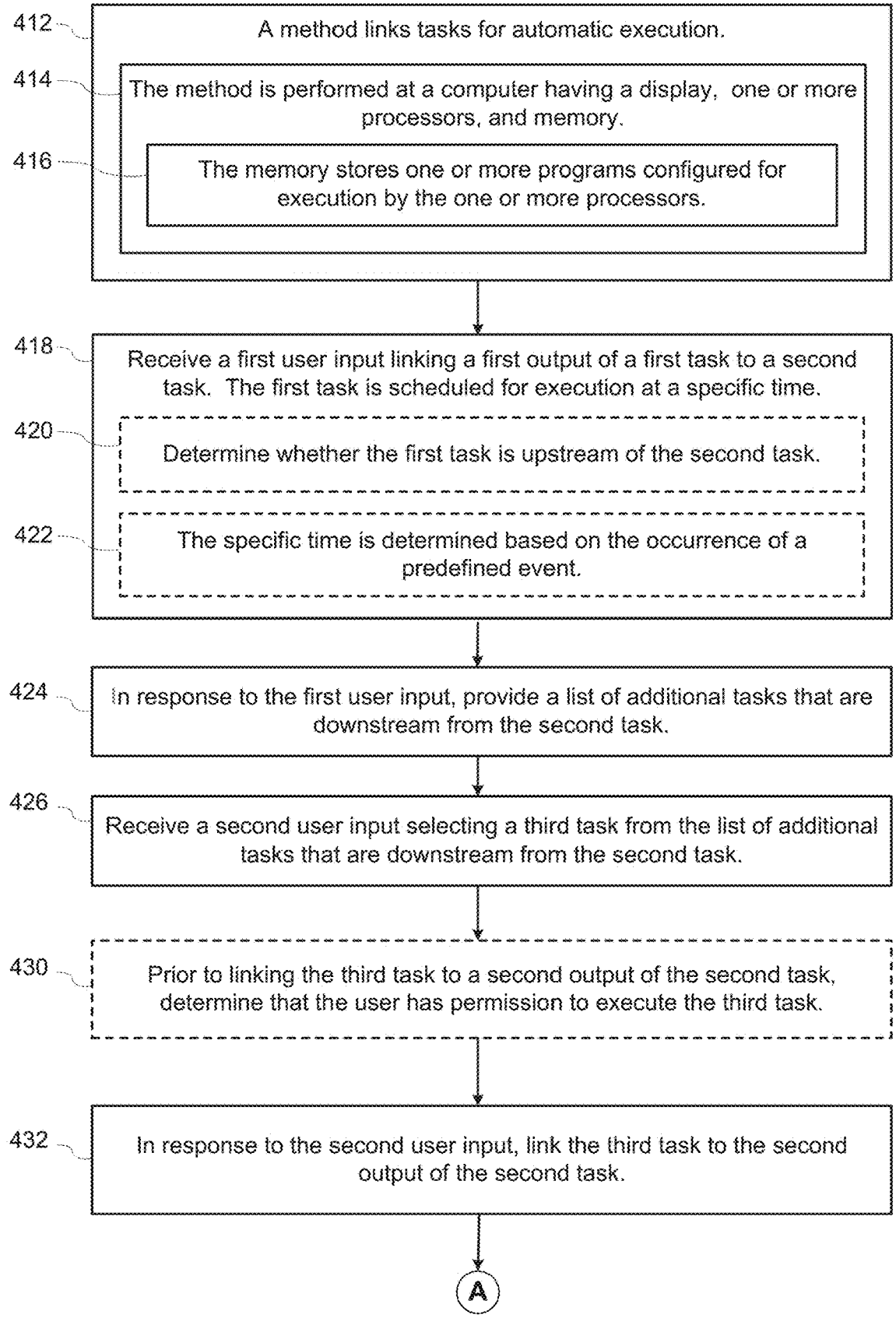
FIGS. 4A and 4B provide a flowchart of a process for linking tasks for automatic execution according to some implementations.
Figure 4B:
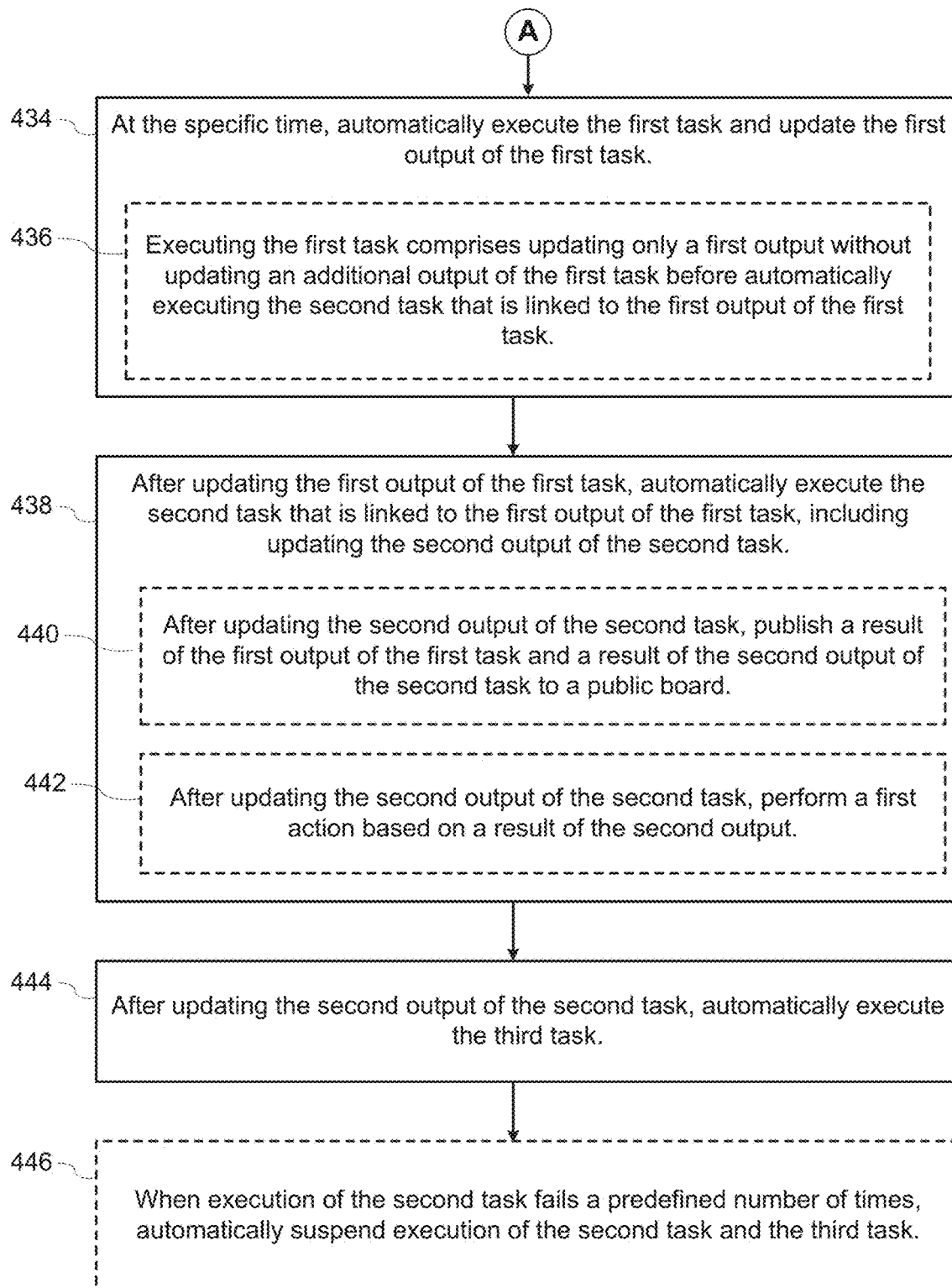

FIGS. 4A and 4B provide a flowchart of a process 410 for linking (412) tasks for automatic execution according to some implementations. The process is performed (414) at a computing device (e.g., a computer) having a display, one or more processors, and memory. The memory stores (416) one or more programs (e.g., a data prep application 250) configured for execution by the one or more processors.

The computing device receives (418) a first user input linking a first output of a first task to a second task. The first task is scheduled for execution at a specific time. In some instances, the second task is downstream from the first task.

In some implementations, the computing device determines (420) whether the first task is upstream of the second task (e.g., where tasks are ordered in a data catalog from upstream to downstream).

In some implementations, the specific time is determined (422) based on the occurrence of a predefined event. For example, the predefined event occurs when all upstream jobs complete, when one or more applications finish refreshing, when one or more extraction flows complete, and/or when (in response to) new data arrives. In some implementations, the predefined event occurs according to a schedule (e.g., every day at a particular time).

In response to the first user input, the computing device provides (424) (e.g., automatically populates) a list of additional tasks that are downstream from the second task. For example, as illustrated in FIG. 3Q, the computing device provides a dropdown 381 that includes a list of downstream flows that are available to be linked to the second task.

The computing device receives (426) a second user input selecting a third task from the list of additional tasks that are downstream from the second task.

In some implementations, prior to linking the third task to the second output of the second task, the computing device determines (430) that the user has permission to execute the third task. In some implementations, the computing device determines that the user has permission to execute the first task before linking the first task to the second task. For example, users that do not have permission to execute a task cannot link the task to other tasks. In some implementations, the computing device checks permissions to run all of the tasks that are linked together, and when there is an error (e.g., due to the user not having permission to run all of the tasks), the computing device displays an indication of the error. In some implementations, the computing device also provides a data quality warning to indicate there has been a data error. In some implementations, data quality errors occur when a data value for a data field fails to satisfy one or more user-defined rules. For example, a rule may specify that a data field has non-NULL values, specify that data values for a numeric data field fall within a designated range (e.g., 2020-2030), or specify a set of discrete allowed data values for a dimension data field.

In response to the second user input, the computing device links (432) the third task to a second output of the second task. The third task can be scheduled to execute when the second output is available, even if the second task has multiple outputs, which are not all complete. The third task does not have to wait for complete execution of the second task (e.g., for all outputs of the second task to be updated). Instead, the third task is linked to an output of the second task such that, in response to completion of the second output of the second task, the third task begins to execute.

At the specific time (e.g., selected based on a schedule, as described with reference to FIG. 3C), the computing device automatically executes (434) the first task and updates the first output of the first task.

In some implementations, executing the first task comprises (436) updating only a first output without updating an additional output of the first task before automatically executing the second task that is linked to the first output of the first task.

After updating the first output of the first task, the computing device automatically executes (438) the second task that is linked to the first output of the first task.

In some instances, after updating the second output of the second task, the computing device publishes (440) a result of the first output of the first task and a result of the second output of the second task to a public board. In some instances, the first output of the first task is published after the first task has completed execution (e.g., without waiting for the second task to also execute/complete). In some instances, the first output of the first task is linked to the second task such that the output of the first task is not published until the second task has also completed.

In some implementations, after updating the second output of the second task, the computing device performs (442) a first action based on a result of the second output (e.g., if the second output or second task fails, the system sends an automatic email or sets up a data quality warning on the data source). In some implementations, the system also provides a notification in accordance with a scheduled task successfully running/refreshing. For example, as described with reference to FIG. 3B, the user can select an option such that if the task "Flow B" succeeds, a next task (e.g., which will be selected below using dropdown 326) will start, and if "Flow B" fails, the next tasks (e.g., the remaining tasks) will not be executed and a notification (e.g., an email) will be sent to the user (e.g., the creator of the linked tasks).

After updating the second output of the second task, the computing device automatically executes (444) the third task. In this way, the first task (e.g., a scheduled task) that updates a first output causes the tasks linked to the first output to also be executed. For example, instead of adding the linked tasks to the schedule directly, the linked tasks can depend on an output of a scheduled task without requiring the user to create a new schedule to execute the linked task.

In some implementations, when execution of the second task fails a predefined number of times, the computing device automatically suspends (446) execution of the second task and the third task and any other tasks linked to the second task, including blocking all of the following (downstream) flows. In some implementations, the user can decide whether or not to allow the remaining tasks to continue running if a task fails, as described with reference to FIG. 3B. For example, the computing device blocks the third task after the second task fails. In some implementations, the computing device pauses and/or removes any remaining tasks in the linked flows.

The disclosed implementations typically provide "instant" or "real-time" updates or feedback based on user actions. In practice, "instant" or "real-time" means within a short period of time and without additional user input. For example, the "instant" or "real-time" updates may occur within one twentieth of a second, one tenth of a second, one half of a second, or a second. As computer processors become more powerful, instant updates can occur more quickly and/or for even more complex operations.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for linking tasks, comprising:
   at a computing device having a display, one or more processors, and memory storing one or more programs configured for execution by the one or more processors:
   receiving a first user input linking a first output of a first task to a second task, wherein the first task is scheduled for execution at a specific time;
   in response to the first user input, providing a list of additional tasks that are downstream from the second task;

receiving a second user input selecting a third task from the list of additional tasks that are downstream from the second task;

in response to the second user input, linking the third task to a second output of the second task; and at the specific time:

automatically executing the first task and updating the first output of the first task without updating an additional output of the first task before automatically executing the second task that is linked to the first output of the first task;

after updating the first output of the first task, automatically executing the second task that is linked to the first output of the first task, including updating the second output of the second task; and after updating the second output of the second task, automatically executing the third task.

2. The method of claim 1, further comprising, determining whether the first task is upstream of the second task.

3. The method of claim 1, further comprising, after updating the second output of the second task, publishing a result of the first output of the first task and a result of the second output of the second task to a public board.

4. The method of claim 1, wherein the specific time is determined based on the occurrence of a predefined event.

5. The method of claim 1, further comprising, prior to linking the third task to the second output of the second task, determining that the user has permission to execute the third task.

6. The method of claim 1, further comprising, after updating the second output of the second task, performing a first action based on a result of the second output.

7. The method of claim 1, further comprising, in accordance with a determination that execution of the second task fails a predefined number of times, automatically suspending execution of the second task and the third task.

8. A computing device, comprising:
one or more processors;
memory;
a display; and
one or more programs stored in the memory and configured for execution by the one or more processors, the one or more programs comprising instructions for:
receiving a first user input linking a first output of a first task to a second task, wherein the first task is scheduled for execution at a specific time;
in response to the first user input, providing a list of additional tasks that are downstream from the second task;
receiving a second user input selecting a third task from the list of additional tasks that are downstream from the second task;
in response to the second user input, linking the third task to a second output of the second task; and
at the specific time:
automatically executing the first task and updating the first output of the first task without updating an additional output of the first task before automatically executing the second task that is linked to the first output of the first task;
after updating the first output of the first task, automatically executing the second task that is linked to the first output of the first task, including updating the second output of the second task; and
after updating the second output of the second task, automatically executing the third task.

9. The computing device of claim 8, wherein the one or more programs further comprise instructions for determining whether the first task is upstream of the second task.

10. The computing device of claim 8, wherein the one or more programs further comprise instructions for, after updating the second output of the second task, publishing a result of the first output of the first task and a result of the second output of the second task to a public board.

11. The computing device of claim 8, wherein the specific time is determined based on the occurrence of a predefined event.

12. The computing device of claim 8, wherein the one or more programs further comprise instructions for, prior to linking the third task to the second output of the second task, determining that the user has permission to execute the third task.

13. The computing device of claim 8, wherein the one or more programs further comprise instructions for, after updating the second output of the second task, performing a first action based on a result of the second output.

14. The computing device of claim 8, wherein the one or more programs further comprise instructions for, in accordance with a determination that execution of the second task fails a predefined number of times, automatically suspending execution of the second task and the third task.

15. A non-transitory computer readable storage medium storing one or more programs configured for execution by a computing device having one or more processors, memory, and a display, the one or more programs comprising instructions for:
receiving a first user input linking a first output of a first task to a second task, wherein the first task is scheduled for execution at a specific time;
in response to the first user input, providing a list of additional tasks that are downstream from the second task;
receiving a second user input selecting a third task from the list of additional tasks that are downstream from the second task;
in response to the second user input, linking the third task to a second output of the second task; and
at the specific time:
automatically executing the first task and updating the first output of the first task without updating an additional output of the first task before automatically executing the second task that is linked to the first output of the first task;
after updating the first output of the first task, automatically executing the second task that is linked to the first output of the first task, including updating the second output of the second task; and
after updating the second output of the second task, automatically executing the third task.

16. The computer readable storage medium of claim 15, wherein the one or more programs further comprise instructions for determining whether the first task is upstream of the second task.

17. The computer readable storage medium of claim 15, wherein the one or more programs further comprise instructions for, after updating the second output of the second task, publishing a result of the first output of the first task and a result of the second output of the second task to a public board.

18. The computer readable storage medium of claim 15, wherein the specific time is determined based on the occurrence of a predefined event.

19. The computer readable storage medium of claim 15, wherein the one or more programs further comprise instructions for, prior to linking the third task to the second output of the second task, determining that the user has permission to execute the third task.

20. The computer readable storage medium of claim 15, wherein the one or more programs further comprise instructions for, after updating the second output of the second task, performing a first action based on a result of the second output.

* * * * *